United States Patent
Islam et al.

(10) Patent No.: US 10,638,497 B2
(45) Date of Patent: Apr. 28, 2020

(54) SYSTEMS AND METHODS FOR SCHEDULING AND RESOURCE ALLOCATION WITH ONE OR MULTIPLE NUMEROLOGIES

(71) Applicant: Huawei Technologies Co., Ltd., Shenzhen (CN)

(72) Inventors: Toufiqul Islam, Ottawa (CA); Amine Maaref, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/968,225

(22) Filed: May 1, 2018

(65) Prior Publication Data
US 2018/0324830 A1 Nov. 8, 2018

Related U.S. Application Data

(60) Provisional application No. 62/502,232, filed on May 5, 2017.

(51) Int. Cl.
*H04W 72/12* (2009.01)
*H04W 72/04* (2009.01)
(Continued)

(52) U.S. Cl.
CPC ....... *H04W 72/1226* (2013.01); *H04L 5/0053* (2013.01); *H04L 5/0094* (2013.01);
(Continued)

(58) Field of Classification Search
CPC ......... H04W 72/0453; H04W 72/1226; H04W 72/1236; H04W 72/1242; H04W 88/02; H04W 72/04
See application file for complete search history.

(56) References Cited

U.S. PATENT DOCUMENTS

2010/0118719 A1* 5/2010 Ishii ................... H04L 1/0003
370/252
2016/0212625 A1* 7/2016 Damnjanovic ... H04W 74/0875
(Continued)

FOREIGN PATENT DOCUMENTS

| CN | 106165510 A | 11/2016 |
|---|---|---|
| WO | 2009017374 A2 | 2/2009 |
| WO | 2016165119 A1 | 10/2016 |

OTHER PUBLICATIONS

Huawei, Hisilicon "Discussion on resource allocation and indication on NR," 3GPP TSG RAN WG1 Meeting #87, R1-1611661, Nov. 14-18, 2016, XP051175633, 4 pages, Reno, Nevada, USA.
(Continued)

*Primary Examiner* — Mewale A Ambaye
(74) *Attorney, Agent, or Firm* — Slater Matsil, LLP

(57) ABSTRACT

Systems and methods of transmitting and receiving resource allocations, and transmitting and receiving on the basis of such resource allocations, are provided. Scheduling information is transmitted from a network to a user equipment to schedule a downlink transmission resource, the scheduling information comprising a first field that schedules a first resource allocation and a second field that schedules resources for a second resource allocation. The first and set of resources may be a first set of M symbols, and the second set of resources may be L-M symbols, where there are L symbols in a scheduling period. One of the sets of resources may be subject to pre-emption while the other set is not. The two sets of resources may use different numerologies, for example using different sub-carrier spacings.

29 Claims, 22 Drawing Sheets

(51) Int. Cl.
    *H04L 5/00*     (2006.01)
    *H04W 88/02*    (2009.01)
(52) U.S. Cl.
    CPC ... *H04W 72/0453* (2013.01); *H04W 72/1236* (2013.01); *H04L 5/0007* (2013.01); *H04W 72/1242* (2013.01); *H04W 88/02* (2013.01)

(56)         References Cited

U.S. PATENT DOCUMENTS

| 2018/0092120 | A1* | 3/2018 | Liu ................... H04W 72/1289 |
| 2018/0167946 | A1* | 6/2018 | Si ....................... H04W 72/005 |
| 2018/0176892 | A1* | 6/2018 | Kim ................... H04W 72/0406 |
| 2018/0206267 | A1* | 7/2018 | Islam ................... H04L 5/0048 |

OTHER PUBLICATIONS

Huawei, Hisilicon "Scheduling scheme for slot aggregation," 3GPP TSG RAN WGI Meeting #88bis, R1-1705067, Apr. 3-7, 2017, XP051243198, 7 pages, Spokane, USA.

Huawei, Hisilicon "Resource Allocation and Indication for Data Channel," 3GPP TSG RAN WGI Meeting #88bis; R1-1705069, Apr. 3-7, 2017, XP051243200, 8 pages, Spokane, USA.

Huawei, Hisilicon "On DL Multiplexing of URLLC and eMBB Transmissions", 3GPP TSG RAN WGI Meeting #88bis, R1-1706170, Apr. 3-7, 2017, XP051252447, 10 pages, Spokane, USA.

* cited by examiner

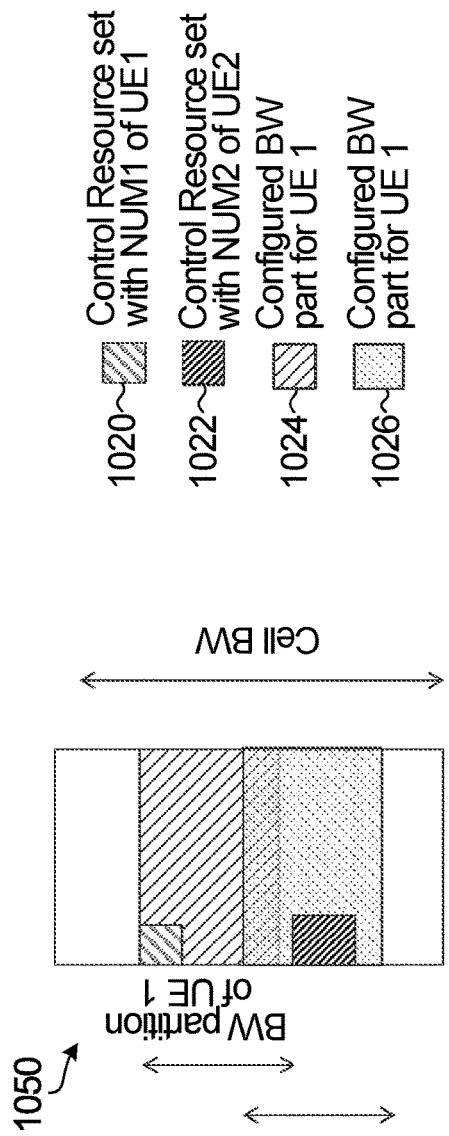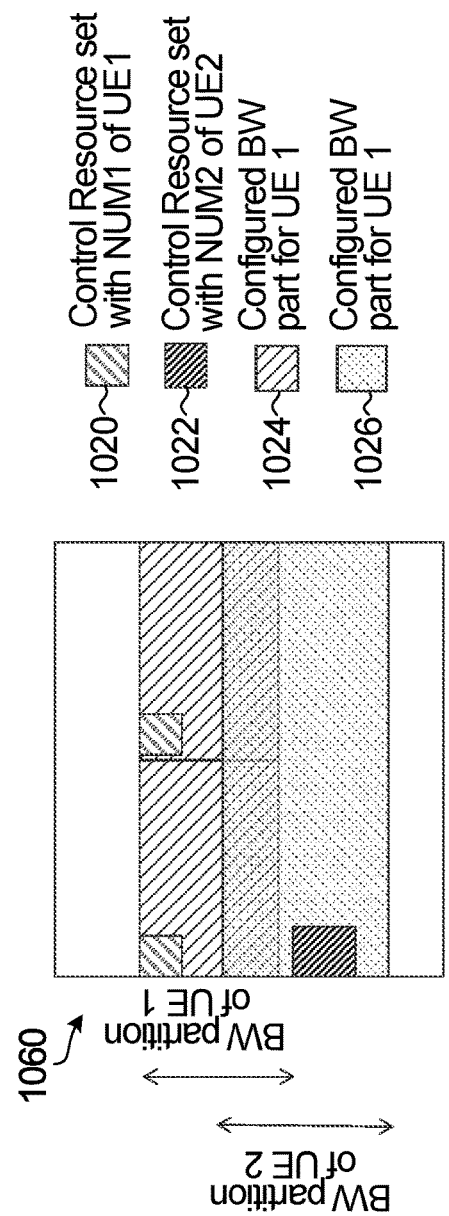
FIG. 6
FIG. 7

SYSTEMS AND METHODS FOR SCHEDULING AND RESOURCE ALLOCATION WITH ONE OR MULTIPLE NUMEROLOGIES

CROSS REFERENCE

This application claims priority to U.S. Application No. 62/502,232, filed on May 5, 2017, entitled "Systems and Methods for Scheduling and Resource Allocation with one or Multiple Numerologies", the entire disclosure of which is hereby incorporated by reference.

FIELD

The application relates to systems and methods for scheduling traffic with one or multiple numerologies. In particular, examples are provided for mixed numerology eMBB (enhanced mobile broadband) and URLLC (ultra-reliable low latency communication) coexistence.

BACKGROUND

In some wireless communication systems, user equipments (UEs) wirelessly communicate with one or more base stations. A wireless communication from a UE to a base station is referred to as an uplink communication. A wireless communication from a base station to a UE is referred to as a downlink communication. Resources are required to perform uplink and downlink communications. For example, a base station may wirelessly transmit data to a UE in a downlink communication at a particular frequency for a particular duration of time. The frequency and time duration are examples of resources.

A base station allocates resources for downlink communications to the UEs served by the base station. The downlink communications may be performed by transmitting orthogonal frequency-division multiplexing (OFDM) symbols.

Some UEs served by a base station may need to receive data from the base station with lower latency than other UEs served by the base station. For example, a base station may serve multiple UEs, including a first UE and a second UE. The first UE may be a mobile device carried by a human who is using the first UE to browse on the Internet. The second UE may be equipment on an autonomous vehicle driving on a highway. Although the base station is serving both UEs, the second UE may need to receive data with lower latency compared to the first UE. The second UE may also need to receive its data with higher reliability than the first UE. The second UE may be an ultra-reliable low latency communication (URLLC) UE, whereas the first UE may be an enhanced mobile broadband (eMBB) UE.

UEs that are served by a base station and that require lower latency downlink communication will be referred to as "low latency UEs". The other UEs served by the base station will be referred to as a "latency tolerant UEs". Data to be transmitted from the base station to a low latency UE will be referred to as "low latency data", and data to be transmitted from the base station to a latency tolerant UE will be referred to as "latency tolerant data". A single UE may use both low latency communication and latency tolerant communication, in which case the term "low latency UE" would refer to the activities of the single UE for the purpose of low latency communication, and the term "latency tolerant UE" would refer to the activities of the single UE for the purpose of latency tolerant communication.

It is desired to have a base station and frame structure that can accommodate the use of the same time-frequency resources by both low latency UEs and latency tolerant UEs.

SUMMARY

Various embodiments are provided that relate to one or a combination of:

Transport block (TB) scheduling with one numerology;
TB scheduling with multiple numerologies;
Time-dependent scheduling and transmission, in which the duration of transmission can be segmented into different parts. For each part, a resource block group (RBG) allocation can be indicated resulting in a time dependent indication. The number of parts can be configured via higher layer. An explicit partition indication in time may or may not be provided in downlink control information (DCI);
numerology specific resource allocation, which may be separately indicated dynamically for each numerology, or semi-statically indicated, for example in the form of a BW partition configuration for each numerology;
code block groups (CBGs) assigned within a numerology, a CB may not span multiple numerologies;
RBG allocation following a common grid or granularity;
Control and data bandwidth parts that can be separately defined, and the control bandwidth part may or may not be also used for data.

According to one aspect of the present invention, there is provided a method in a user equipment, the method comprising: receiving scheduling information to schedule a downlink transmission resource, the scheduling information comprising a first field that schedules resources for a first resource allocation and a second field that schedules resources for a second resource allocation.

Optionally, in any of the preceding embodiments, the method further comprises receiving a configuration of a first numerology for a first bandwidth partition, and a second numerology for a second bandwidth partition; wherein receiving the scheduling information is in respect of resource allocations for a transport block that includes a part in the first bandwidth partition and a part in the second bandwidth partition; and the method further comprising receiving a transmission containing the transport block, a portion of the transmission that is in the first bandwidth partition being received with the first numerology, and a portion of the transmission that is in the second bandwidth partition being received with the second numerology.

Optionally, in any of the preceding embodiments, the scheduling information is based on a resource block (RB) or resource block group (RBG) grid based on a default numerology.

Optionally, in any of the preceding embodiments, the default numerology is the numerology of the first and second numerologies with the larger sub-carrier spacing.

Optionally, in any of the preceding embodiments, the first numerology has a sub-carrier spacing that is a multiple P of the sub-carrier spacing of the second numerology; and the scheduling information comprises a bitmap containing bits in respect of resource allocation in the first bandwidth partition for the first numerology and bits in respect of resource allocation in the second bandwidth for the second numerology; each bit in respect of resource allocation in the first bandwidth partition for the first numerology is in respect of a single RB or RBG of the first numerology; each bit in respect of resource allocation in the second bandwidth partition for the second numerology is in respect of a set of P RBs or RBGs of the second numerology.

Optionally, in any of the preceding embodiments, receiving the configuration comprises receiving a configuration of M numerologies, where M>=2, and the M numerologies comprise the first numerology and the second numerology; the transport block further includes respective parts in each of the M numerologies, and the scheduling information indicates resource allocations for each of the M numerologies; and receiving the transmission containing the transport block comprises receiving the transmission using each of the M numerologies in accordance with the received scheduling information.

Optionally, in any of the preceding embodiments, receiving the transmission comprises receiving code block groups, wherein each code block group is mapped to a single numerology of the M numerologies.

Optionally, in any of the preceding embodiments, the received scheduling information includes a respective field for each of the M numerologies.

Optionally, in any of the preceding embodiments, the received scheduling information includes a bitmap that includes one or more bits to allocate resource blocks (RBs) or resource block groups (RBGs) for each of the M numerologies.

Optionally, in any of the preceding embodiments, the method further comprises receiving a configuration of a value for M.

Optionally, in any of the preceding embodiments, a part of the scheduled downlink transmission resource has been pre-empted by low latency traffic transmitted in the first bandwidth partition using the first numerology.

Optionally, in any of the preceding embodiments, the first field schedules resources for a first set of M symbols, and the second field schedules resources for a second set of L-M symbols, where there are L symbols in a scheduling period.

Optionally, in any of the preceding embodiments, the method comprises receiving a configuration of a value for M.

Optionally, in any of the preceding embodiments, the first field includes a first bitmap, and the second field includes a second bitmap.

Optionally, in any of the preceding embodiments, the scheduling information is in respect of a resource allocation for resources that include a part subject to pre-emption by latency sensitive traffic and a part that is not subject to pre-emption.

Optionally, in any of the preceding embodiments, the method comprises receiving a transmission on the scheduled downlink transmission resource using a single numerology.

Optionally, in any of the preceding embodiments, the method further comprises receiving a pre-emption indication that indicates at least part of the scheduled downlink transmission resource has been pre-empted.

Optionally, in any of the preceding embodiments, the transmission resource has been pre-empted by latency sensitive traffic transmitted using a different numerology.

According to another aspect of the present invention, there is provided a user equipment (UE) comprising: a transmitter and a receiver; a processor and at least one antenna; the UE configured to receive scheduling information to schedule a downlink transmission resource, the scheduling information comprising a first field that schedules resources for a first resource allocation and a second field that schedules resources for a second resource allocation.

Optionally, in any of the preceding embodiments, the UE is further configured to: receive a configuration of a first numerology for a first bandwidth partition, and a second numerology for a second bandwidth partition, wherein receiving the scheduling information is in respect of resource allocations for a transport block that includes a part in the first bandwidth partition and a part in the second bandwidth partition; and receive a transmission containing the transport block, a portion of the transmission that is in the first bandwidth partition being received with the first numerology, and a portion of the transmission that is in the second bandwidth partition being received with the second numerology.

Optionally, in any of the preceding embodiments, the scheduling information is based on a resource block (RB) or resource block group (RBG) grid based on a default numerology.

Optionally, in any of the preceding embodiments, the default numerology is the numerology of the first and second numerologies with the larger sub-carrier spacing.

Optionally, in any of the preceding embodiments, the first numerology has a sub-carrier spacing that is a multiple P of the sub-carrier spacing of the second numerology; and the scheduling information comprises a bitmap containing bits in respect of resource allocation in the first bandwidth partition for the first numerology and bits in respect of resource allocation in the second bandwidth for the second numerology; each bit in respect of resource allocation in the first bandwidth partition for the first numerology is in respect of a single RB or RBG of the first numerology; each bit in respect of resource allocation in the second bandwidth partition for the second numerology is in respect of a set of P RBs or RBGs of the second numerology.

Optionally, in any of the preceding embodiments, receiving the configuration comprises receiving a configuration of M numerologies, where M>=2, and the M numerologies comprise the first numerology and the second numerology; the transport block further includes respective parts in each of the M numerologies, and the scheduling information indicates resource allocations for each of the M numerologies; and receiving the transmission containing the transport block comprises receiving the transmission using each of the M numerologies in accordance with the received scheduling information.

Optionally, in any of the preceding embodiments, receiving the transmission comprises receiving code block groups, wherein each code block group is mapped to a single numerology of the M numerologies.

Optionally, in any of the preceding embodiments, the first field schedules resources for a first set of M symbols, and the second field schedules resources for a second set of L-M symbols, where there are L symbols in a scheduling period.

Optionally, in any of the preceding embodiments, the scheduling information is in respect of a resource allocation for resources that include a part subject to pre-emption by latency sensitive traffic and a part that is not subject to pre-emption.

According to another aspect of the present invention, there is provided a method in a base station, the method comprising: transmitting scheduling information to schedule a downlink transmission resource, the the scheduling information comprising a first field that schedules resources for a first resource allocation and a second field that schedules resources for a second resource allocation.

Optionally, in any of the preceding embodiments, the method further comprises transmitting a configuration of a first numerology for a first bandwidth partition, and a second numerology for a second bandwidth partition; wherein transmitting the scheduling information is in respect of resource allocations for a transport block that includes a part in the first bandwidth partition and a part in the second bandwidth partition; and the method further comprising transmitting a transmission containing the transport block, a portion of the transmission that is in the first bandwidth partition being transmitting with the first numerology, and a portion of the transmission that is in the second bandwidth partition being received with the second numerology.

Optionally, in any of the preceding embodiments, the first field schedules resources for a first set of M symbols, and the second field schedules resources for a second set of L-M symbols, where there are L symbols in a scheduling period.

Optionally, in any of the preceding embodiments, the scheduling information is in respect of a resource allocation for resources that include a part subject to pre-emption by latency sensitive traffic and a part that is not subject to pre-emption.

According to another aspect of the present invention, there is provided a base station comprising: a transmitter and a receiver; a processor; and a scheduler configured to generate scheduling information for transmission by the transmitter to schedule a downlink transmission resource, the scheduling information comprising a first field that schedules resources for a first resource allocation and a second field that schedules resources for a second resource allocation.

Optionally, in any of the preceding embodiments, the scheduler is further configured to: transmit a configuration of a first numerology for a first bandwidth partition, and a second numerology for a second bandwidth partition, wherein transmitting the scheduling information is in respect of resource allocations for a transport block that includes a part in the first bandwidth partition and a part in the second bandwidth partition; and transmit a transmission containing the transport block, a portion of the transmission that is in the first bandwidth partition being transmitted with the first numerology, and a portion of the transmission that is in the second bandwidth partition being transmitted with the second numerology.

Optionally, in any of the preceding embodiments, the first field schedules resources for a first set of M symbols, and the second field schedules resources for a second set of L-M symbols, where there are L symbols in a scheduling period.

Optionally, in any of the preceding embodiments, the scheduling information is in respect of a resource allocation for resources that include a part subject to pre-emption by latency sensitive traffic and a part that is not subject to pre-emption.

According to another aspect of the present invention, there is provided a method comprising: receiving signalling indicating one of a plurality of DMRS configurations to use in respect of a bandwidth partition, the plurality comprising at least a first configuration and a second configuration; in the first configuration, during a pre-empted slot, there is no DMRS for the pre-empted traffic; in the second configuration, during a pre-empted slot, a resource is reserved for DMRS for the pre-empted traffic.

Optionally, in any of the preceding embodiments, the signalling is in respect of a plurality of URLLC slots aggregated for an eMBB transmission.

According to another aspect of the present invention, there is provided a method comprising: receiving control information in resources within a first bandwidth partition; receiving data in resources within a second bandwidth partition; wherein resources in the first bandwidth partition that are not used for control information are made available for data transmission.

BRIEF DESCRIPTION OF THE DRAWINGS

Embodiments will now be described in further detail with reference to the attached drawings in which:

FIG. 6 depicts an example of partially overlapping bandwidth partitions for two UEs having the same scheduling duration;

FIG. 7 depicts an example of partially overlapping bandwidth partitions for two UEs having the different scheduling durations;

DETAILED DESCRIPTION

Figure 1:
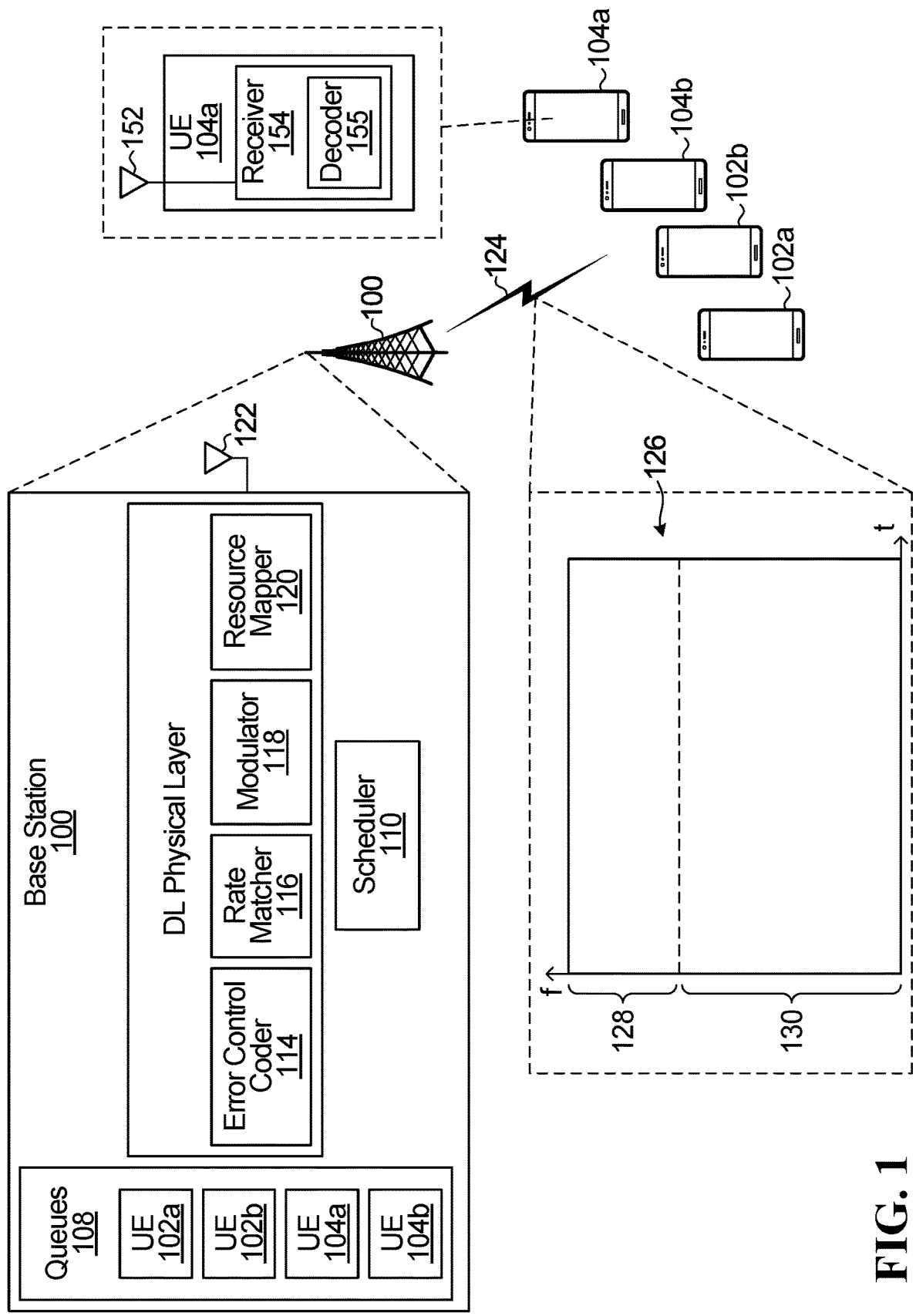
FIG. 1 is a block diagram of a network featuring a base station and user equipment configured to implement one or more of the embodiments described herein.

Generally, embodiments of the present disclosure provide a method and system for coexistence of low latency and latency tolerant communications. For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

FIG. 1 is a block diagram of a base station 100, as well as four UEs 102a, 102b, 104a, and 104b served by the base station 100, according to one embodiment. UEs 102a and 102b are low latency UEs, and UEs 104a and 104b are latency tolerant UEs. That is, UEs 102a and 102b require lower latency downlink communication compared to UEs 104a and 104b. For example, UEs 102a and 102b may be URLLC UEs, and UEs 104a and 104b may be eMBB UEs. Although the base station 100 only serves four UEs in FIG. 1, in actual operation the base station 100 may serve many more UEs. It is also contemplated that a single UE might be served by more than one base station 100. Downlink transmissions to the latency tolerant UEs are typically grant-based, but may be grant-free. Also, downlink transmissions to the low latency UEs may be grant-based or grant-free.

The base station 100 includes queues 108 for storing data to be sent to UEs served by the base station 100. The queues 108 may be implemented by memory, e.g., physical registers. The base station 100 further includes a scheduler 110 for scheduling UEs on available resources. The base station 100 further includes processing blocks for implementing the downlink physical layer, such as an error control coder 114, a rate matcher 116, a modulator 118, and a resource mapper 120. The downlink physical layer of the base station 100 may include other processing blocks, but these have been omitted for the sake of clarity.

The scheduler 110, error control coder 114, rate matcher 116, modulator 118, and resource mapper 120 may each be implemented by a processor that executes instructions that cause the processor to perform the operations of the scheduler 110, error control coder 114, rate matcher 116, modulator 118, and resource mapper 120. The same or different processor may be used to implement each of the scheduler 110, error control coder 114, rate matcher 116, modulator 118, and resource mapper 120. Alternatively, the scheduler 110, error control coder 114, rate matcher 116, modulator 118, and/or resource mapper 120 may be implemented using dedicated integrated circuitry, such as an application specific integrated circuit (ASIC), a graphics processing unit (GPU), or a programmed field programmable gate array (FPGA) for performing the functions of the scheduler 110, error control coder 114, rate matcher 116, modulator 118, and/or resource mapper 120.

The base station 100 further includes one or more antennas 122 to wirelessly transmit signals carrying data for UEs 102a, 102b, 104a, and 104b. Only one antenna 122 is illustrated. The base station 100 may include other circuitry and/or modules for performing other functions, e.g. for uplink communication, but these have been omitted for the sake of clarity.

The term "base station" encompasses any device that wirelessly communicates with UEs using uplink and downlink communications. Therefore, in some implementations, the base station 100 may be called other names, such as a transmit and receive point (TRP), a base transceiver station, a radio base station, a network node, a transmit/receive node, a Node B, an eNodeB (eNB), a gNB (sometimes called a "gigabit" Node B), a relay station, or a remote radio head. Also, in some embodiments, the parts of the base station 100 may be distributed. For example, some of the modules/processing blocks of the base station 100 may be located remote from the equipment housing the antennas of the base station 100, and may be coupled to the equipment housing the antennas over a communication link (not shown). Therefore, in some embodiments, the term base station 100 may also refer to modules/processing blocks on the network side that perform processing operations, such as scheduling and downlink control signal generation, and that are not necessarily part of the equipment housing the antennas of the base station 100. The modules/processing blocks may also be coupled to other base stations. In some embodiments, the base station 100 may actually be a plurality of base stations that are operating together to serve the UEs, e.g. through coordinated multipoint transmissions.

UEs 1042a,102b,104a,104b are meant to be illustrative of any end user devices which may be configured as disclosed herein for uplink/downlink communication with BS 100. Examples of user devices include wireless transmit/receive units (WTRUs), mobile stations, wireless devices, fixed or mobile subscriber units, cellular telephones, personal digital assistants (PDAs), smart phones, laptops, computers, touch-pads, wireless sensors, and consumer electronics devices.

As noted above, UEs 102a,102b are UEs that may require low latency, and have sporadic traffic requirements, and UEs 104a,104b are UEs that may not have as tight a latency requirement, and may have more consistent traffic requirements, at least when active. In a more specific example, the UEs 102a,102b employ orthogonal frequency division multiplexing (OFDM) to transmit URLLC traffic. It is contemplated that OFDM may be used in combination with orthogonal multiple access or a non-orthogonal multiple access scheme such as Sparse Code Multiple Access (SCMA), Interleave-Grid Multiple Access (IGMA), Multi-user shared access (MUSA), Low code rate spreading, Frequency domain spreading, Non-orthogonal coded multiple access (NCMA), Pattern division multiple access (PDMA), Resource spread multiple access (RSMA), Low density spreading with signature vector extension (LDS-SVE), Low code rate and signature based shared access (LSSA), Non-orthogonal coded access (NOCA), Interleave Division Multiple Access (IDMA), Repetition division multiple access (RDMA) and Group Orthogonal Coded Access (GOCA). UEs 104a,104b, for example, transmit enhanced mobile broadband (eMBB) traffic. UEs 104a,104b may also use OFDM in combination with orthogonal multiple access or a non-orthogonal multiple access scheme.

When the base station 100 has data to transmit to UEs 102a, 102b, 104a, and/or 104b, the base station 100 transmits this data in one or more downlink transmissions using allocated resources. A set of time frequency resources 126 is divided into a coexistence bandwidth partition 128, and a latency tolerant bandwidth partition 130. The resources within the coexistence partition 128 are available for transmission of both low latency downlink traffic and latency tolerant downlink traffic, while the latency tolerant partition is available for transmission of latency tolerant downlink traffic.

In operation, data that is to be transmitted from the base station 100 to UEs is stored in the queues 108. For a particular downlink transmission, the scheduler 110 assigns available resources to respective UEs being served by the base station 100. Low latency data destined for low latency UEs is transmitted in the low latency resources 128, and latency tolerant data destined for latency tolerant UEs is scheduled in the latency tolerant resources 130 and/or low latency resources 128. The scheduler 110 uses an algorithm to decide which resources should be assigned to which UEs. An example of an algorithm that may be used by the scheduler 110, to assign resources for low latency traffic, is a delay-based algorithm that takes account of the latency constraints of the low latency traffic. When just latency tolerant traffic is present, a proportionally fair (PF) scheduling algorithm may be used. When a resource partition is assigned to a UE, an appropriate number of bits are removed from the queue corresponding to that UE and sent to the downlink physical layer. The error control coder 114 encodes the bits using an error control code to result in coded bits. One example of an error control code that may be applied by the error control coder 114 is a turbo code. The coded bits output from the error control coder 114 may be subject to rate matching in rate matcher 116. The rate matcher 116 may match the number of bits in a transport block to the number of bits that can be transmitted in the given allocation, and the rate matching may involve sub-block interleaving, bit collection, and/or pruning. The modulator 118 then modulates the coded bits to generate modulated symbols. The resource mapper 120 maps the modulated symbols to the resources assigned to the UE.

An example implementation of UE 104a is illustrated in more detail in FIG. 1 and includes one or more antennas 152 for receiving the downlink transmissions 124. Only one antenna 152 is illustrated. The UE 104a includes a receiver 154 for processing the received downlink transmissions 124. For example, the receiver 154 may implement downlink physical layer processing, such as decoding and demodulation to extract the data, pilot sequences and signaling destined for UE 104a. A decoder 155 for performing decoding is illustrated. The receiver 154 and the decoder 155 may each be implemented by a processor that executes instructions that cause the processor to perform the operations of the receiver 154 and the decoder 155. The same or different processor may be used to implement each of the receiver 154 and the decoder 155. Alternatively, the receiver 154 and/or the decoder 155 may be implemented using dedicated integrated circuitry, such as an ASIC, GPU, or a FPGA for performing the functions of the receiver 154 and/or the decoder 155. UE 104b has a similar structure to UE 104a.

Figure 2:
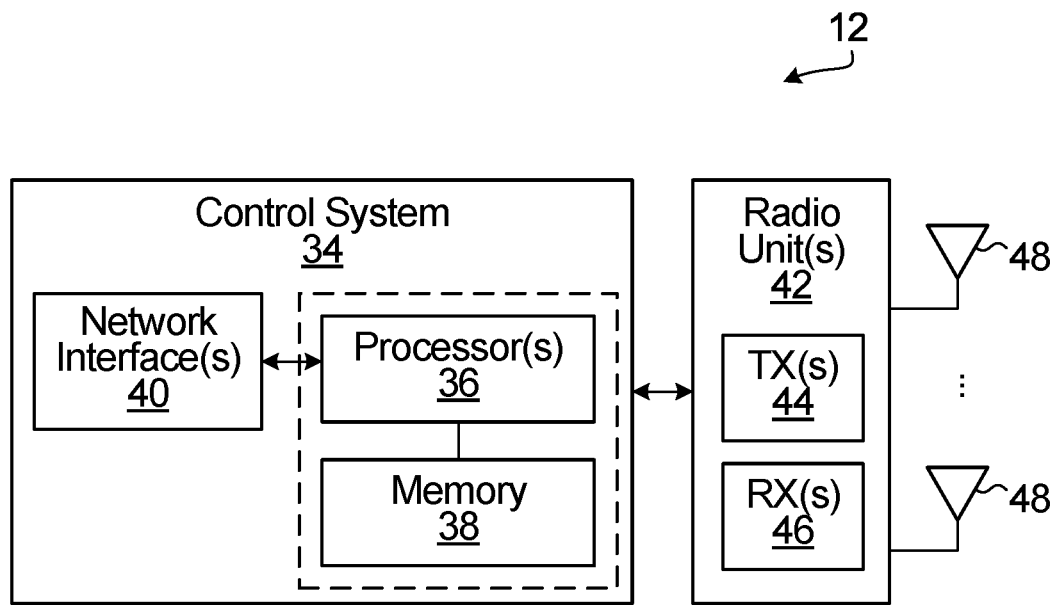
FIG. 2 is a block diagram of a base station which configured to implement one or more of the embodiments described herein.

FIG. 2 is a schematic block diagram of a BS 12 according to some embodiments of the present disclosure. As illustrated, the BS 12 includes a control system 34 configured to perform the network-side functionality described herein. In some implementations, the control system 34 is in the form of circuitry configured to perform the network-side functions. In yet other implementations, the control system or circuitry 34 includes one or more processors 36 (e.g., CPUs, ASICs, FPGAs, and/or the like) and memory 38 and possibly a network interface 40. The BS 12 also includes one or more radio units 42 that each includes one or more transmitters 44 and one or more receivers 46 coupled to one or more antennas 48. In some other implementations, the functionality of the BS 12 described herein may be fully or partially implemented in software or modules that is, e.g., stored in the memory 38 and executed by the processor(s) 36.

In yet other implementations, a computer program including instructions which, when executed by at least one processor, causes the at least one processor to carry out the functionality of the BS 12 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 3:
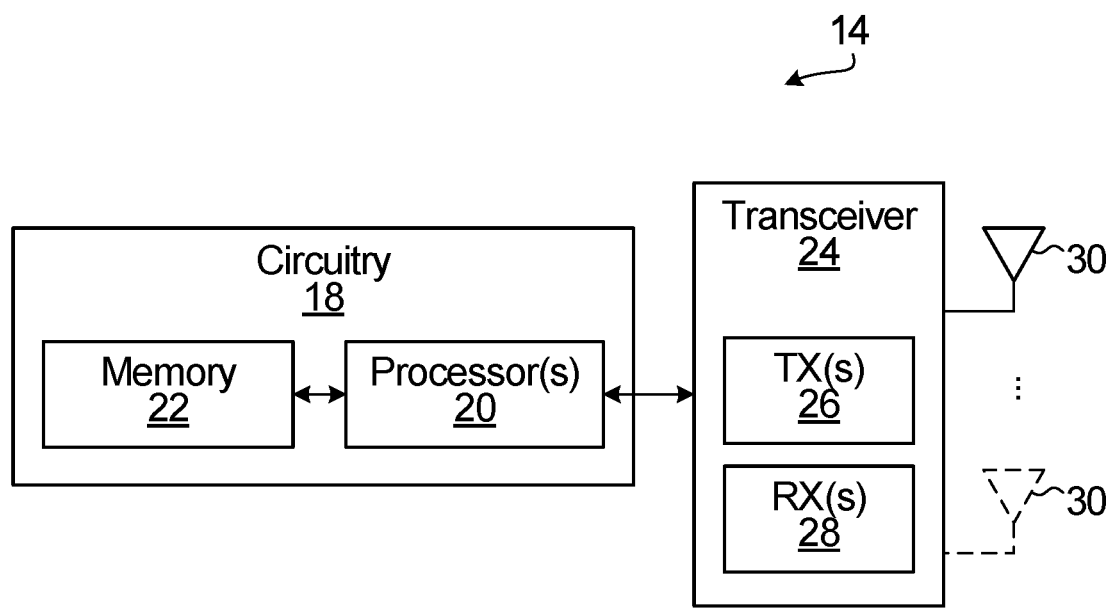
FIG. 3 is a block diagram of a user equipment which configured to implement one or more of the embodiments described herein.

FIG. 3 is a schematic block diagram of a wireless device according to some embodiments of the present disclosure. As illustrated, the wireless device includes circuitry 18 configured to perform the wireless device functions described herein. In some implementations, the circuitry 18 includes one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some other implementations, the functionality of the wireless device 14 described herein may be fully or partially implemented in software or modules that is, e.g., stored in the memory 22 and executed by the processor(s) 20.

In yet other implementations, a computer program including instructions which, when executed by at least one processor, causes the at least one processor to carry out the functionality of the wireless device 14 according to any of the embodiments described herein is provided. In yet other implementations, a carrier containing the aforementioned computer program product is provided. The carrier is one of an electronic signal, an optical signal, a radio signal, or a computer readable storage medium (e.g., a non-transitory computer readable medium such as memory).

Figure 4:
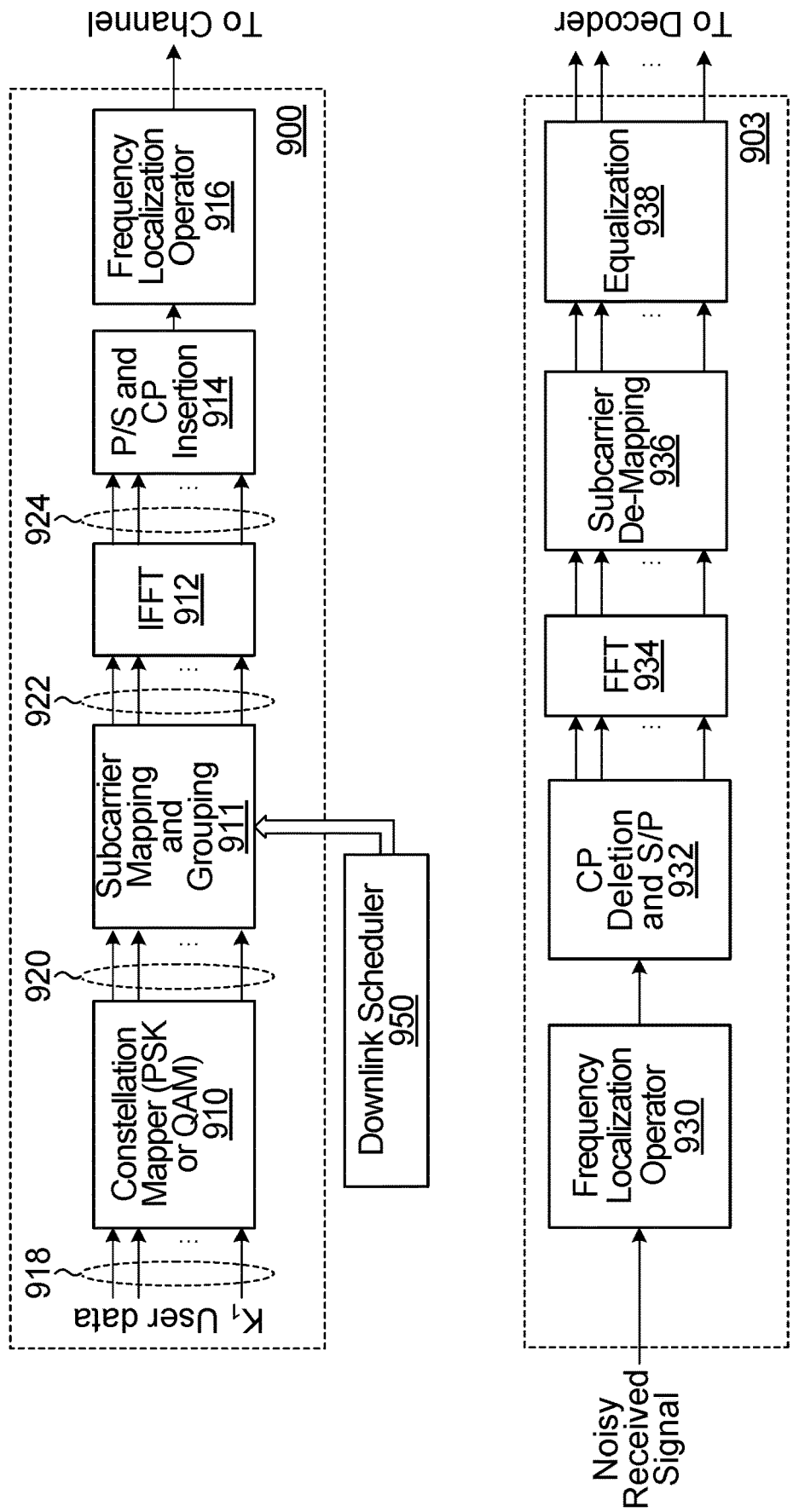
FIG. 4 is a block diagram of another base station which configured to implement one or more of the embodiments described herein.

FIG. 4 is another example of a base station with a transmit chain generally indicated at 900, and a receive chain of a base station generally indicated at 903.

The transmit chain 900 includes a constellation mapper 910, sub-carrier mapping and grouping block 911, IFFT 912, pilot symbol and cyclic prefix insertion 914, and frequency localization operator 916 (for example filtering, sub-band filtering, windowing, sub-band windowing). Also shown is a downlink scheduler 950 that performs downlink scheduling.

In operation, constellation mapper 910 receives UE data (more generally, UE content containing data and/or signalling) for downlink transmission to $K_1$ UEs, where $K_1 >= 1$. The constellation mapper 910 maps the UE data for each of the $K_1$ UEs to a respective stream of constellation symbols and outputs this at 920. The number of UE bits per symbol depends on the particular constellation employed by the constellation mapper 910. In the example of quadrature amplitude modulation (QAM), 2 bits from for each UE are mapped to a respective QAM symbol.

For each OFDM symbol period, the sub-carrier mapping and grouping block 911 groups and maps the constellation symbols produced by the constellation mapper 910 to up to P inputs of the IFFT 912 at 922. The grouping and mapping is performed based on downlink scheduling information received from the downlink scheduler 950, in accordance with a defined resource block definition and allocation for the content of the $K_1$ UEs being processed in transmit chain

900. As noted above, downlink transmissions are generally scheduled for all UEs. P is the size of the IFFT 912. Not all of the P inputs are necessarily used for each OFDM symbol period. The IFFT 912 receives up to P symbols, and outputs P time domain samples at 924. Following this, in some implementations, time domain pilot symbols are inserted and a cyclic prefix is added in block 914. The frequency localization operator 916 may, for example, apply a filter which limits the spectrum at the output of the transmit chain 900.

The receive chain 903 includes frequency localization operator 930, cyclic prefix deletion and pilot symbol processing 932, fast Fourier transform (FFT) 934, sub-carrier de-mapping 936 and equalizer 938. Each element in the receive chain performs corresponding reverse operations to those performed in the transmit chain. The receive chain 903 receives uplink signals generated in accordance with the scheduling information and/or resource allocation information generated by the scheduler and/or resource allocator 960. The sub-carrier de-mapper 936 makes also makes use of the scheduler information and/or resource allocation information from the scheduler and/or resource allocator 960.

When multiple numerologies are supported, as per the embodiments described in detail below, there may be corresponding multiple instances of the transmit chain 900 and the receive chain 903 in the base station.

Figure 5:
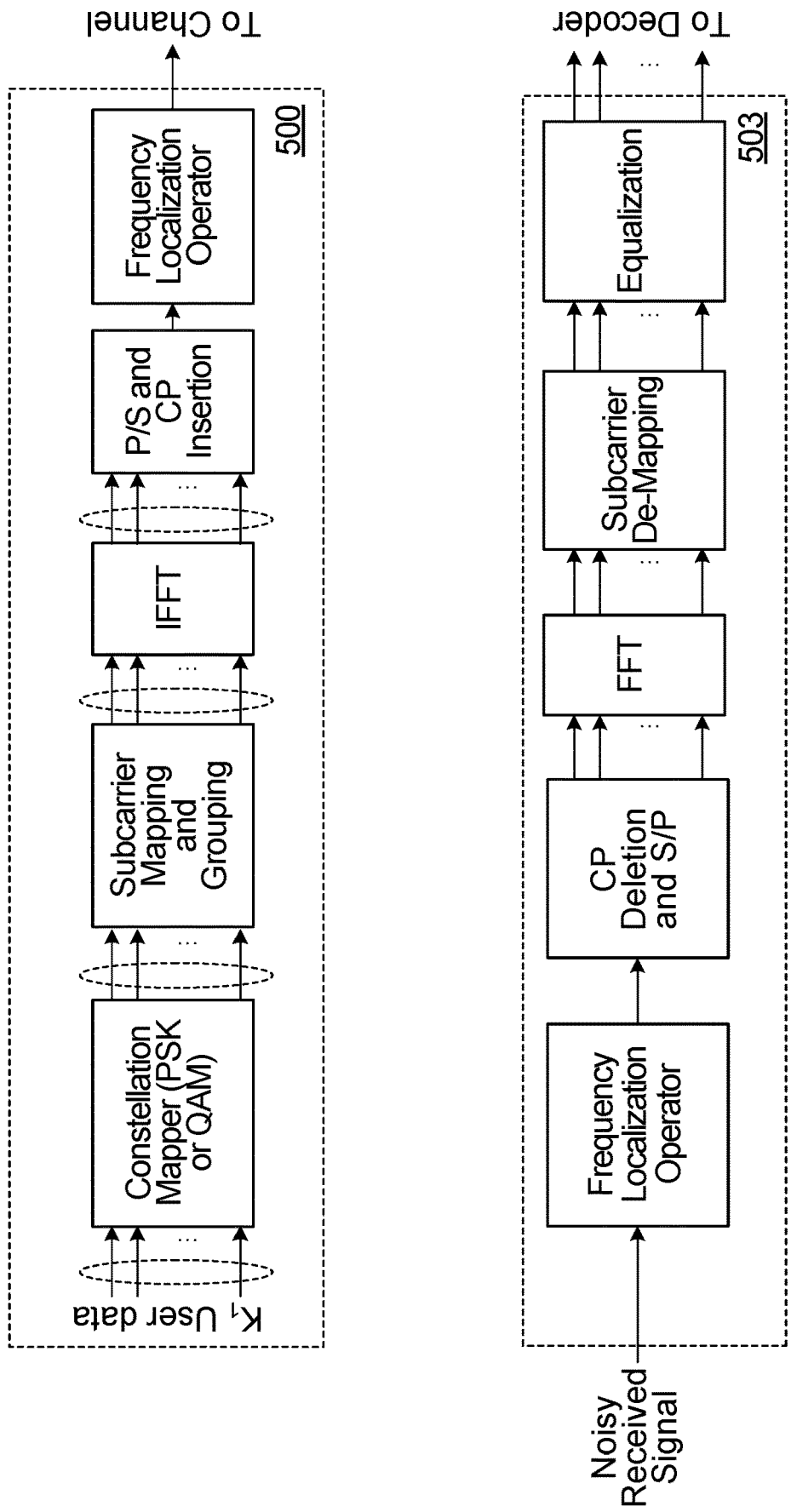
FIG. 5 is a block diagram of another user equipment which configured to implement one or more of the embodiments described herein.

FIG. 5 is an example of a UE with a transmit chain generally indicated at 500, and a receive chain generally indicated at 503. The transmitter and receiver of a UE may be similar to those of a base station although there would be no scheduler in the UE. Rather, the UE will receive the scheduling information and/or the resource allocation information, and will receive downlink transmissions in accordance with the received scheduling information.

For efficient resource sharing, the transmission of latency tolerant communication and latency sensitive communication can be scheduled using the same or overlapping time-frequency resources.

To allow for improved latency to be provided for latency sensitive traffic compared to latency tolerant traffic, latency tolerant traffic has a scheduling interval longer than that of latency sensitive traffic.

Latency sensitive traffic scheduling can be achieved by pre-emption of resources which were originally scheduled for latency tolerant traffic. When this occurs, a pre-emption indication can be sent dynamically to notify the UE receiving latency tolerant traffic that part of its scheduled traffic has been pre-empted or postponed.

The pre-emption indication can be sent at the time of arrival of the latency sensitive traffic, near the end of scheduling interval of latency tolerant traffic either within the interval or near the beginning of next interval, or at the beginning of another following interval, for example when a re-transmission is scheduled after HARQ feedback.

The pre-emption indication can be explicit or implicit, and can be UE specific, or group-common. Group-common indications may be broadcast or multi-cast, for example. eMBB UEs can be configured to monitor the pre-emption indication. eMBB UEs can be configured via RRC signaling or a group-common PDCCH may notify a group of UEs whether they need to monitor pre-emption indication.

In one example, UE can receive scheduled re-transmission after an impacted/pre-empted transmission either before or after HARQ feedback. Re-transmission or a subsequent transmission before or after HARQ feedback can be CBG-based. Subsequent transmission before HARQ feedback can also include or consist of impacted/pre-empted symbols or impacted/pre-empted symbol(s)+RBGs of the previous impacted transmission. UE can be configured to receive subsequent transmission based on CBGs or any other pre-emption granularity such as symbol(s) mentioned above. In the case of pre-emption or subsequent transmission before HARQ feedback, one or more other new or existing fields are used to indicate the pre-emption information. For example, if the retransmission is happening following a pre-empted transmission, then the field that provides pre-emption information can be based on granularity of symbols or symbols and RBGs or other granularities mentioned above. If the re-transmission is following a HARQ feedback, then the field may provide information of which CBGs are transmitted or which RV is transmitted. In a specific example, the RV field may indicate a group of symbols that were pre-empted if the re-transmission is based on pre-emption or scheduled before HARQ feedback, whereas for other cases, the RV field can be used in a conventional manner for TB-level transmission or CBG-based transmission or to indicate which CBGs are being transmitted. This can be useful if subsequent transmission can be based on a different granularity than CBGs. UE can be configured to read RV field for pre-emption information if the re-transmission is scheduled in a subsequent slot after impacted transmission but before HARQ feedback. The configuration of the UE can be conveyed via higher layer.

A RBG is a group of physical resource blocks (PRB)s that is usually defined for the purpose of reducing scheduling overhead, i.e. the unit for resource allocation becomes RBGs instead of PRBs. In LTE, RBG is specified per carrier bandwidth. In NR, RBGs may be defined per bandwidth part. The pre-emption indication can indicate pre-emption to any granularity of time and/or frequency.

Furthermore, latency sensitive traffic may use a mini-slot (i.e., number of symbols less than slot) for transmission scheduling.

eMBB and URLLC traffic can be transmitted with the same numerology, or with different numerologies. To reduce blind detection attempts and mitigate effects on eMBB performance, time frequency resources can be divided between a coexistence region where eMBB and URLLC traffic coexist, and an eMBB-only region dedicated to eMBB traffic.

In the detailed embodiments that follow, the low latency traffic is assumed to be URLLC, and the latency tolerant traffic is assumed to be eMBB, but it should be understood that these embodiments are applicable to low latency traffic generally, and latency tolerant traffic generally.

Many of the embodiments are described in the context of an eMBB-only and coexistence region. However, as noted previously, the embodiments are generalized to cover traffic types other than eMBB and URLLC. In addition, the presence of a coexistence region, while assumed in many of the examples, is not a requirement generally. For example, for embodiments that provide for eMBB TB scheduling with one numerology, the method of resource allocation provided can be applied irrespective of whether there is a coexistence region. In addition, in some embodiments, the coexistence region may be the whole carrier bandwidth in which case there is no eMBB-only region. In this case, eMBB traffic might use a first numerology, with URLLC traffic using a second numerology. Alternatively, both eMBB and URLLC uses same numerology but URLLC uses fewer symbols in the interval.

Where the expression "coexistence region" is used, this can also refer to a bandwidth part where URLLC traffic can be scheduled and eMBB traffic can be scheduled. An eMBB-only region refers to a bandwidth part where only eMBB traffic is scheduled. Note however, a given UE may not be aware of these definitions. Rather, a given UE may only be informed of its bandwidth partition (s), and the numerology(ies) to use in such partitions. For example, a URLLC UE may be configured with a bandwidth partition that includes some or all of the coexistence region and/or another region. An eMBB UE may be configured with a bandwidth partition that does not include any of the coexistence region, includes some or all of the coexistence region, or is only in the coexistence region.

When pre-emption occurs, the UE simply needs to be able to map a received pre-emption indication to the pre-empted/impacted resources based on the pre-emption indication, if received.

Note that any of the embodiments described herein are applicable to both FDD and TDD. While some of the examples feature a specific time duration, more generally, the examples and embodiments are applicable to time durations generally; these can be, for example, slots, symbols or some combination of slots and symbols The eMBB-only region and the coexistence region can employ different numerologies. For example, there may be a first bandwidth partition for eMBB-only that has a numerology with a 15 KHz sub-carrier spacing, and a second bandwidth partition for coexistence that has a numerology with a 60 KHz sub-carrier spacing. This allows for a shorter slot duration and shorter scheduling interval in the coexistence region for latency sensitive traffic.

It has been assumed that eMBB scheduling is confined either within eMBB-only region or in coexistence region. For example, a transport block (TB) may be entirely in the 15 KHz region or the 60 KHz region. Signalling may be used to indicate the coexistence region or whether eMBB UEs can expect pre-emption by URLLC traffic and need to monitor pre-emption indication. eMBB traffic in the coexistence region is subject to possible pre-emption by URLLC traffic. Then, if a UE is scheduled in the co-existence region or partially overlap with coexistence region, it would know that its traffic is subject to possible pre-emption/interference from URLLCC traffic, and the UE can prepare for possible pre-emption, and monitor for pre-emption, puncturing etc. If the UE is scheduled in the eMBB-only region, then the UE does not need to perform such monitoring.

Figure 8:
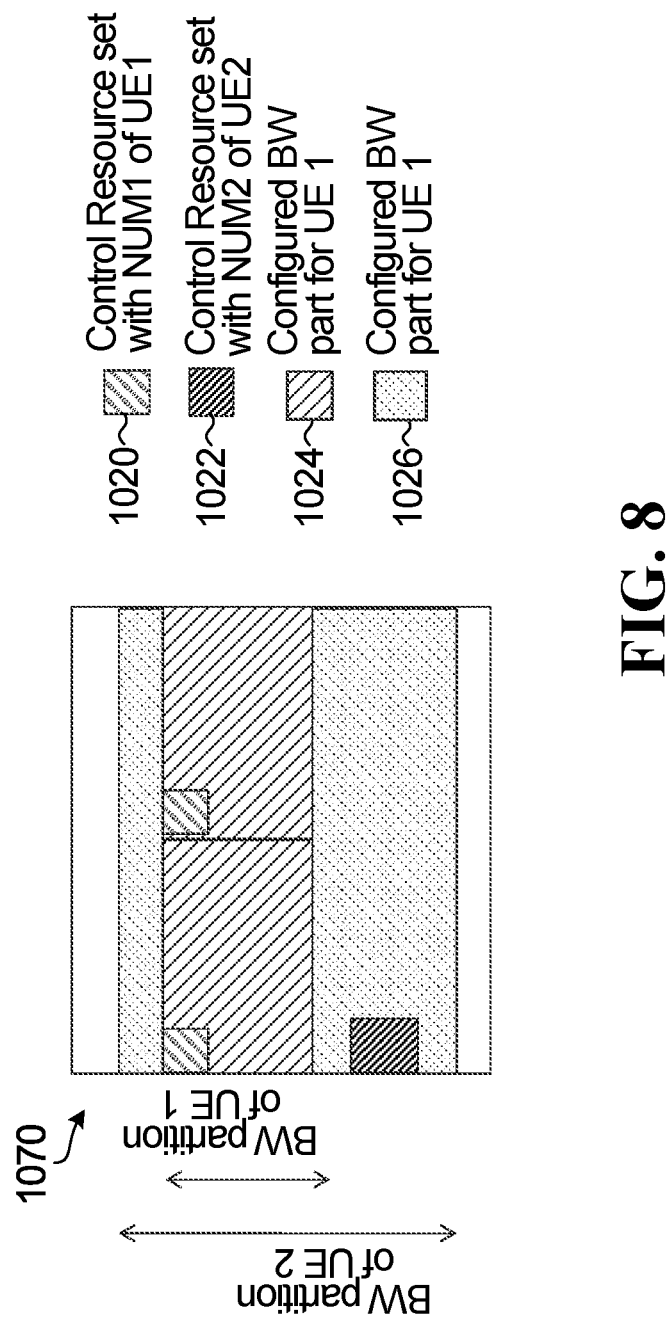
FIG. 8 depicts an example of completely overlapping bandwidth partitions for two UEs having the different scheduling durations.

A UE can be configured with a bandwidth partition (BP) that indicates where its resource blocks can be scheduled. This is to be contrasted with a resource allocation, which allocates specific resources to UE for a particular transmission; such resource allocation takes place within the bandwidth partition of a given UE. The BPs for different UEs can be overlapping. FIGS. 6,7 and 8 show three examples of bandwidth partitions, generally indicated at 1050, 1060, 1070. With all three examples, a control resource set with a first numerology NUM1 for a first UE, UE1, is indicated at 1020, a control resource set with a second numerology NUM2 for a second UE, UE2, is indicated at 1022, a configured bandwidth partition for the UE1 is indicated at 1024, and a configured bandwidth partition for UE2 is indicated at 1026. UE1 might be a URLLC UE and UE2 might be an eMBB UE.

In the first example 1050 in FIG. 6, the bandwidth partitions 1024,1026 are overlapping. The scheduling duration for the two UEs is the same. The control resources 1020,1022 are fixed at the beginning of the slot. In LTE, these are common areas that are not UE specific, and typically located in two or three symbols at the beginning of a slot.

A UE can be configured with one or multiple search spaces called control resource set candidates. The search spaces are configured by RRC signalling. The bandwidth partition of a UE can be used for transmission using one numerology or multiple numerologies.

In the second example 1060 in FIG. 7, a scheduling duration for UE1 is half that of UE2, and there is a partial overlap between the two bandwidth partitions 1024,1026.

In the third example 1070 in FIG. 8, a scheduling duration for UE1 is again half that of UE2, and bandwidth partition 1024 is entirely overlapped by bandwidth partition 1026.

Figure 9A:
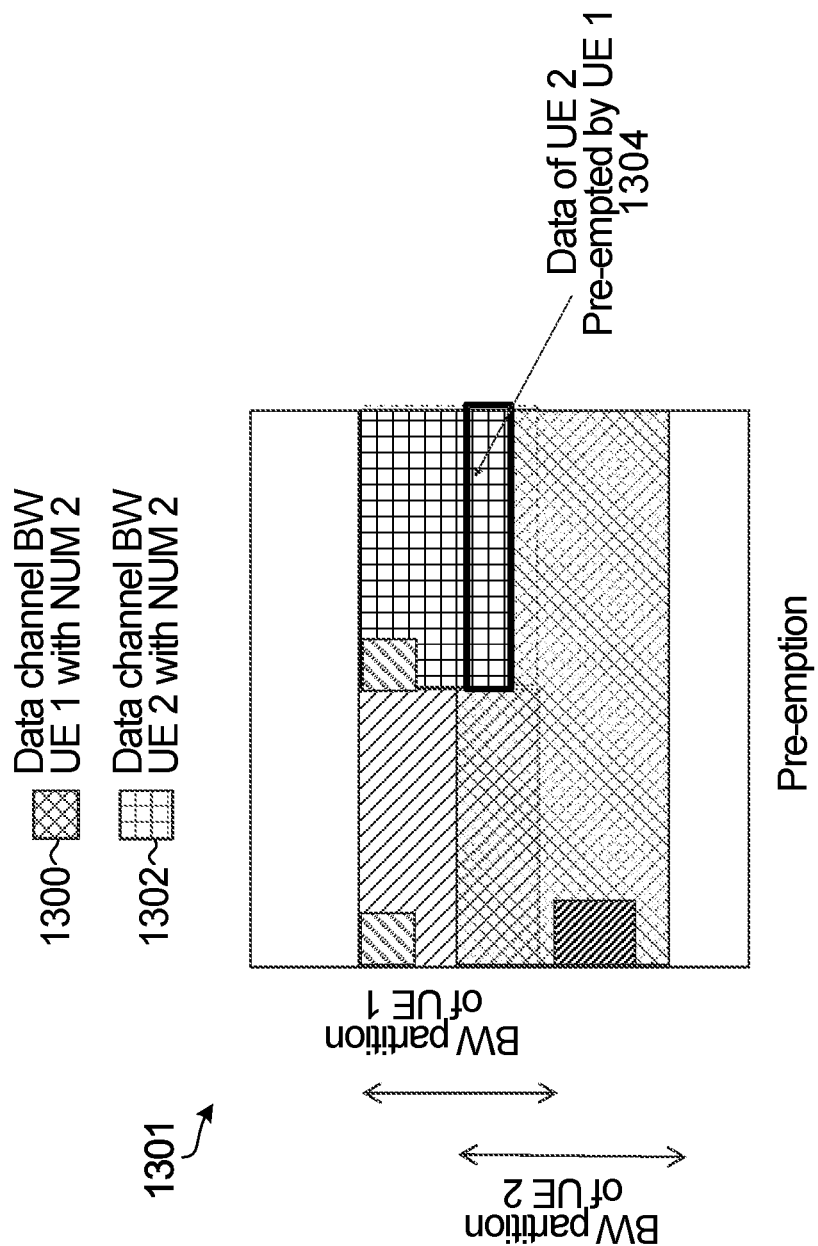
FIG. 9A depicts an example in which traffic for a first UE is scheduled in area which overlaps with an area scheduled for a second UE, and data of the second UE is pre-empted by the traffic of UE1.

FIG. 9A shows another example 1301 in which traffic for UE1 is scheduled in area 1300 which overlaps with an area 1302 scheduled for UE2. In area 1304, the data of UE2 is pre-empted by the traffic of UE1. In this example, the overlapping UEs are using the same numerology. Mixed numerologies are also possible.

Figure 9B:
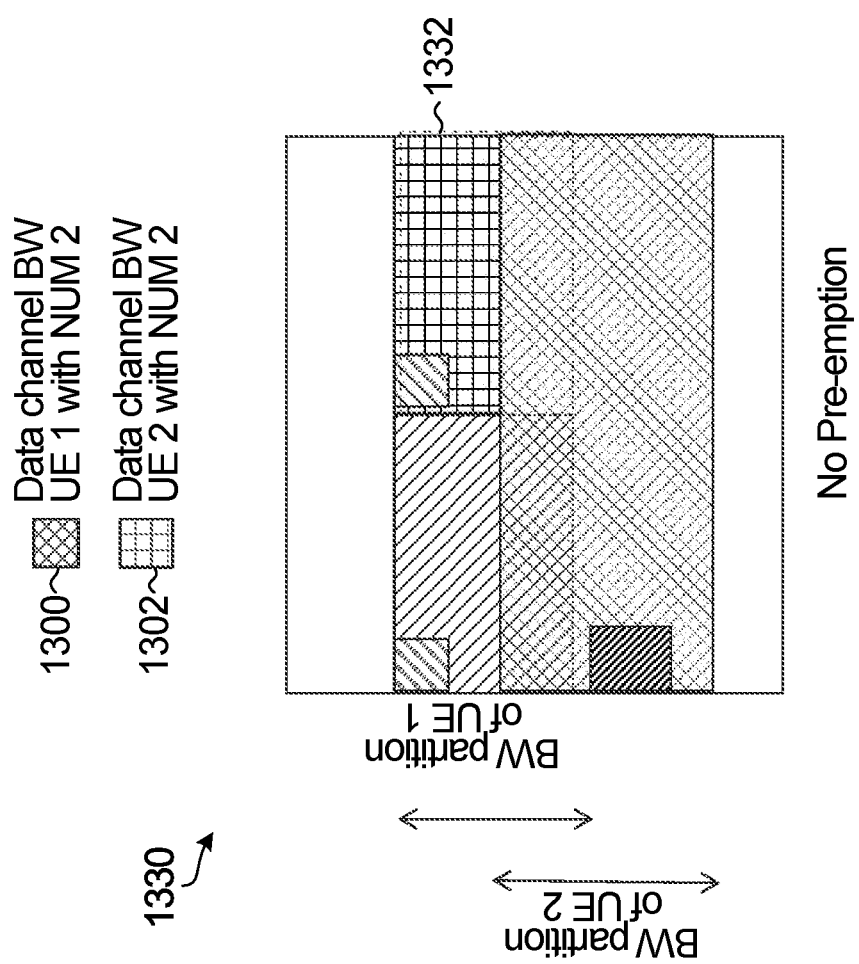
FIG. 9B depicts an example in which traffic for a first UE is scheduled in area which overlaps with an area scheduled for a second UE, and data of the second UE is not pre-empted by the traffic of UE1.

In contrast, with the second example 1330 shown in FIG. 9B, the traffic for UE 1 is scheduled in area 1332 which does not overlap with the area scheduled for UE2, and as such there is no pre-emption.

The two regions (eMBB-only and coexistence) may be semi-statically configured, however, in some cases, the eMBB-only region may not be sufficient to serve eMBB load. Changing the size of regions dynamically can be costly. In some embodiments, eMBB scheduling is allowed to span both regions (e.g., if bandwidth partition configured of an eMBB UE spans both the eMBB-only region and the coexistence region).

The network (for example an eNb or gNb) can decide if it wants to accommodate a eMBB TB scheduling spanning both regions, without changing the configurations of the regions.

Figure 10:
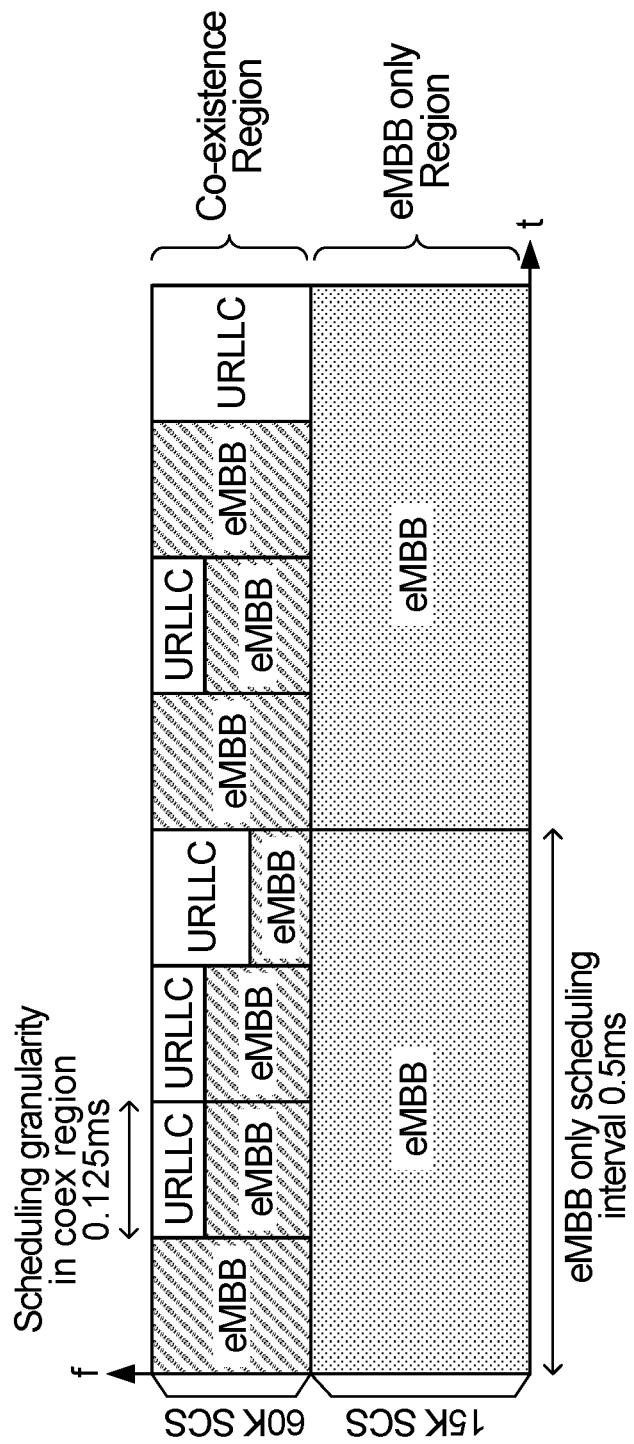
FIG. 10 depicts an example downlink multiplexing without pre-emption.

In one approach, downlink multiplexing is performed without pre-emption. In this case, eMBB and URLLC traffic assume the same scheduling granularity in the coexistence region. eMBB small packets can be scheduled in the coexistence region, and as such no pre-emption is needed. An example is shown in FIG. 10.

Figure 11A:
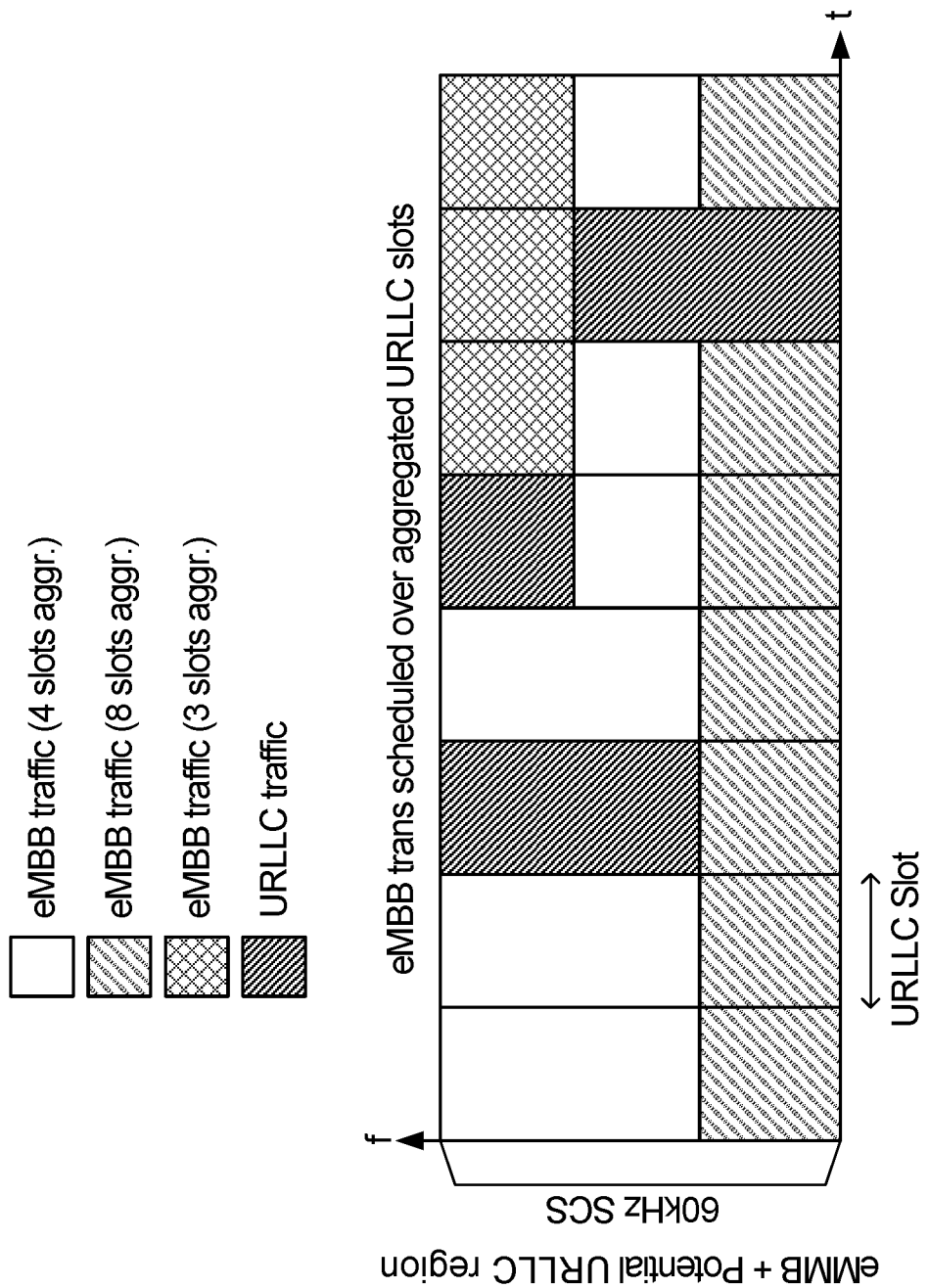
FIGS. 11A and 11B depict an example of downlink multiplexing with pre-emption.
Figure 11B:
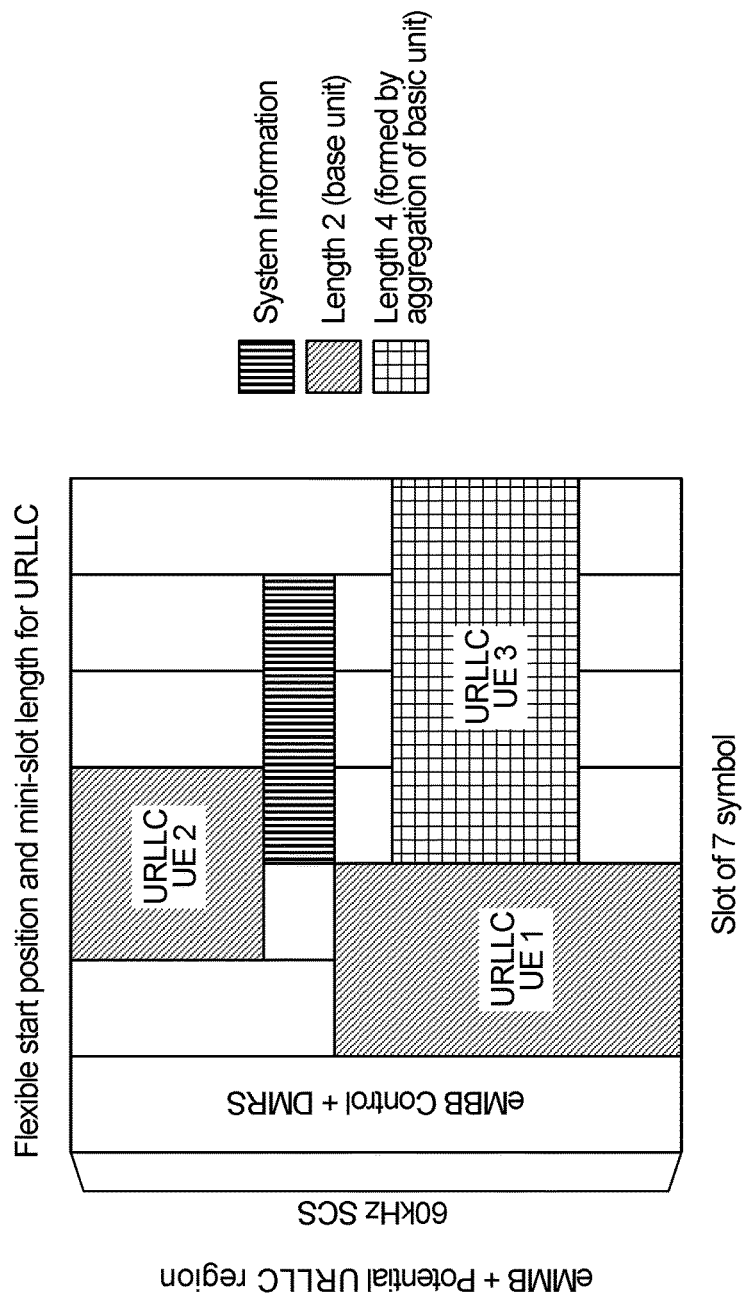

In another approach, downlink multiplexing is performed with pre-emption. In this case, the eMBB scheduling interval is longer than URLLC scheduling granularity. In a first example, eMBB is scheduled over multiple aggregated URLLC slots, e.g., 60 kHz slots. An example is shown in FIG. 11A. In a second example, eMBB is scheduled over a slot using 15 kHz, and URLLC uses mini-slots, a mini slot being a group of symbols where number of symbols is less than the number of symbols in a slot. An example is shown in FIG. 11B which allows for a flexible mini-slot based scheduling for URLLC. The start position is flexible and different lengths of transmission are realized by aggregation of a basic mini-slot granularity, for example one symbol. Mini-slot scheduling is performed so as to avoid resource elements containing critical system information and control/DMRS (at least front loaded) of slot. Alternatively, a UE may be supported with a set of mini-slot lengths.

Figure 12:
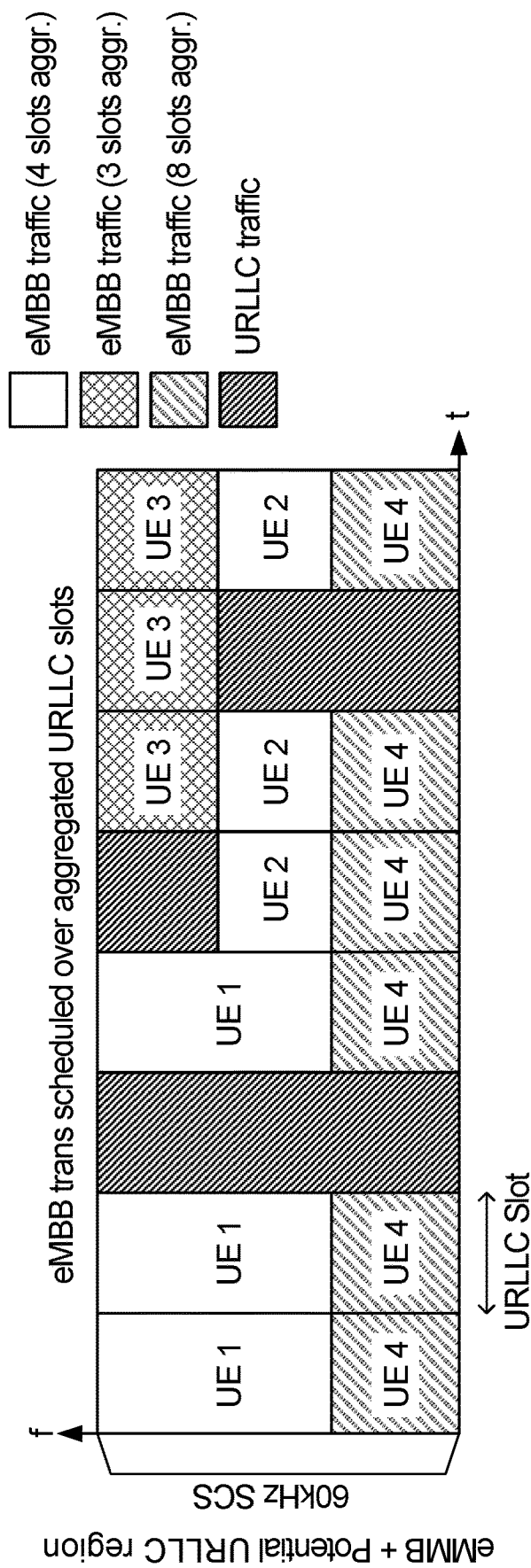
FIG. 12 depicts an example of slot aggregation in a coexistence region.

An example of slot aggregation in a coexistence region is shown in FIG. 12.

Figure 13A:
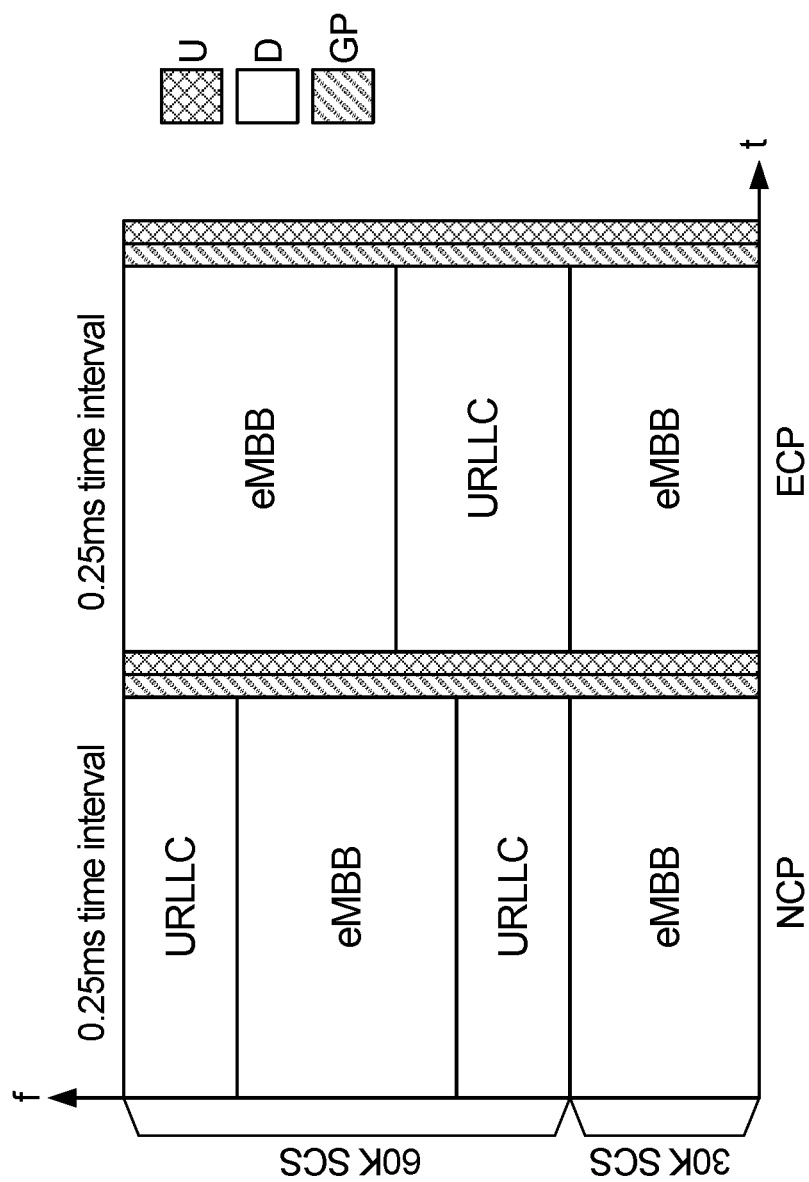
FIGS. 13A and 13B depict examples of coexistence in the downlink of traffic with the same or different cyclic prefix (CP) overhead.
Figure 13B:
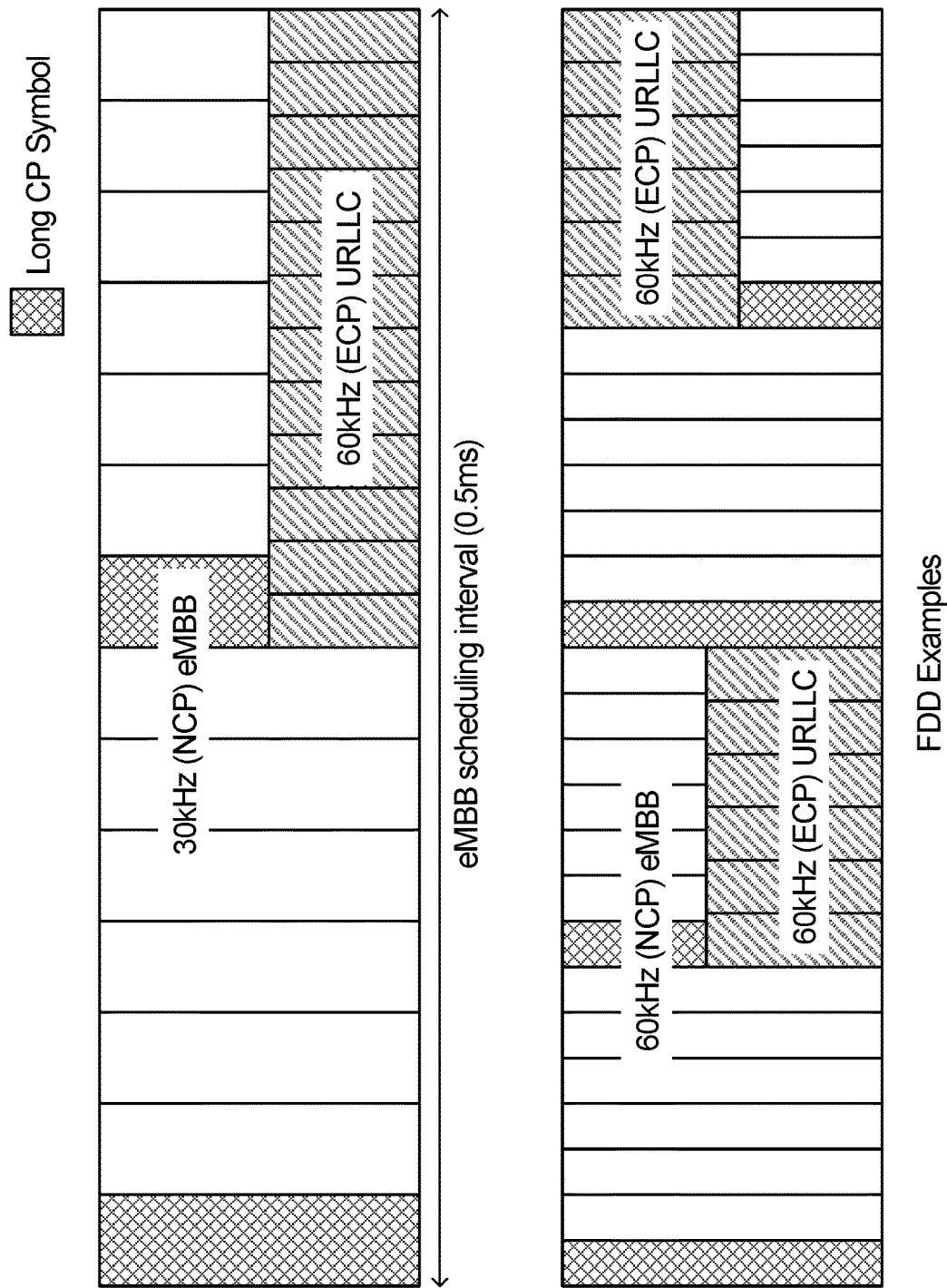

An example of coexistence in the downlink of traffic with the same or different cyclic prefix (CP) overhead is shown in FIGS. 13A and 13B. eMBB and URLLC transmissions may coexist with same or different CP overhead (for example normal cyclic prefix (NCP) and extended cyclic prefix (ECP)). NCP/ECP coexistence can occur with the same or different sub-carrier spacing. From one interval to another, the CP type may change. A UE can be configured with at least one control resource set for transmission with either CP type. If a UE supports both ECP and NCP, network may configure UE via RRC signaling to monitor control resource set(s) of which CP type when. In another example, the UE may blindly monitor control resource set(s) of both ECP and NCP in different bandwidth parts.

New methods of scheduling a transport block are provided. In the following discussion, eMBB traffic is used as a specific example of latency tolerant traffic, and URLLC is used as a specific example of latency intolerant traffic. In some cases the latency tolerance and intolerance can be defined specifically. However, more generally, the expressions latency tolerant and latency intolerant are used in a relative sense. In general, latency tolerant traffic being more tolerant to latency than latency intolerant. However, all of the embodiments and examples can be generalized to other types of latency tolerant traffic and latency intolerant traffic. In some embodiments, if an eMBB TB is scheduled to span both a coexistence region and an eMBB-only region, the eMBB TB is scheduled to always use one numerology for the eMBB traffic in both regions, notwithstanding that a different numerology might be used by URLLC in the coexistence region. In some embodiments, if an eMBB TB is scheduled to span both regions, TB scheduling employs multiple numerologies, consistent with numerologies assigned to those regions. Both of these approaches are described in detail below. For both of these approaches, resources can be shared between URLLC and eMBB. However, there may or may not be any region or bandwidth part dedicated for eMBB and/or URLLC. For example, all of the bandwidth can be shared between the two. For the first approach described below, the coexistence region is an example to show that if a TB spans some region where URLLC traffic can be scheduled (not necessarily defined as a coexistence region), this kind of TB scheduling can be helpful for resource utilization. URLLC can be scheduled with the same or different numerology.

One Numerology for eMBB TB in eMBB-only and Coexistence Regions

In this embodiment, bandwidth partitions for eMBB-only and URLLC are configured, for example semi-statically, and an eMBB TB can be scheduled spanning both eMBB-only and coexistence regions, the coexistence region encompassing at least part but not necessarily all of the bandwidth partition for URLLC. For this embodiment, the URLLC traffic in the coexistence region uses a first numerology, and eMBB traffic in both the coexistence region and the eMBB-only region uses a second numerology, although in some embodiments, eMBB traffic can use the same numerology as URLLC traffic. There may be multiple eMBB UEs with different configured numerologies.

An eMBB UE operating in the coexistence region is subject to pre-emption. Signalling may be transmitted to advise the UE of this pre-emption, in which case the UE needs to monitor for such signaling. Bandwidth partitions for each UE may also be configured semi-statically. Some eMBBs may be configured with bandwidth partitions that span the two regions in which case such UEs will monitor the pre-emption signal, while other eMBB UEs may be configured with bandwidth partitions that are only within the eMBB-only region in which case such UEs will not need to monitor for pre-emption signalling. In another example, some other eMBB UEs may be configured with bandwidth partitions that are only within the coexistence region and those UEs would always monitor for pre-emption.

In one example, control of eMBB and URLLC can be received in same symbol(s). If URLLC traffic arrives when eMBB traffic is also scheduled, eMBB scheduling may avoid some RBGs of the first few symbols. In another example, a control region of a slot may comprise M symbols and with remaining symbols of the slot only carrying data. In that case, eMBB scheduling may avoid some RBGs in the symbol(s) of the control region, depending on which control resource sets are used.

For aggressive resource allocation, a time-dependent frequency resource allocation can be indicated in an eMBB downlink control information (DCI). By time-dependent, it is meant that the resource allocation can change as a function of time within a resource allocation. Such time dependent resource allocation can be used to account for (i.e. omit) a part of the co-existence region that is being used for URLLC.

In addition, time dependent scheduling can be present for other purposes. For example, a first M symbols may have a control region of other UEs, which are avoided for a subject UE. If the control region has content for other UEs and if the control region spans M symbols, then some RBs in the first M symbols are not used, and can be avoided through time dependent scheduling.

In a specific example, the resource allocation signalling includes a field that has two parts. A first part is a K-bit bitmap for K resource blocks (RBs) or resource block groups (RBGs) that is valid for the first M symbols of a slot, and a second part is a K-bit bitmap for K RBs or RBGs valid for L-M symbols of the slot, where L is the number of symbols in a slot. An RBG is a set of one or more resource blocks. K is function of the UE BW or the bandwidth part configured for the UE.

In some embodiments, the value of M may be configurable. For example, this can be transmitted as part of a layer 1 broadcast or can be sent to a eMBB UE with radio resource control (RRC) signalling.

A specific example will be described with reference to FIG. 14. Part of a coexistence region is indicated at 1800, and part of the eMBB-only region is indicated at 1802. For this example, URLLC traffic uses 30 KHz sub-carrier spacing, and eMBB traffic uses a 15 KHz sub-carrier spacing. A symbol transmitted with a 30 KHz sub-carrier spacing is also referred to herein as a 30 KHz symbol.

Figure 14:
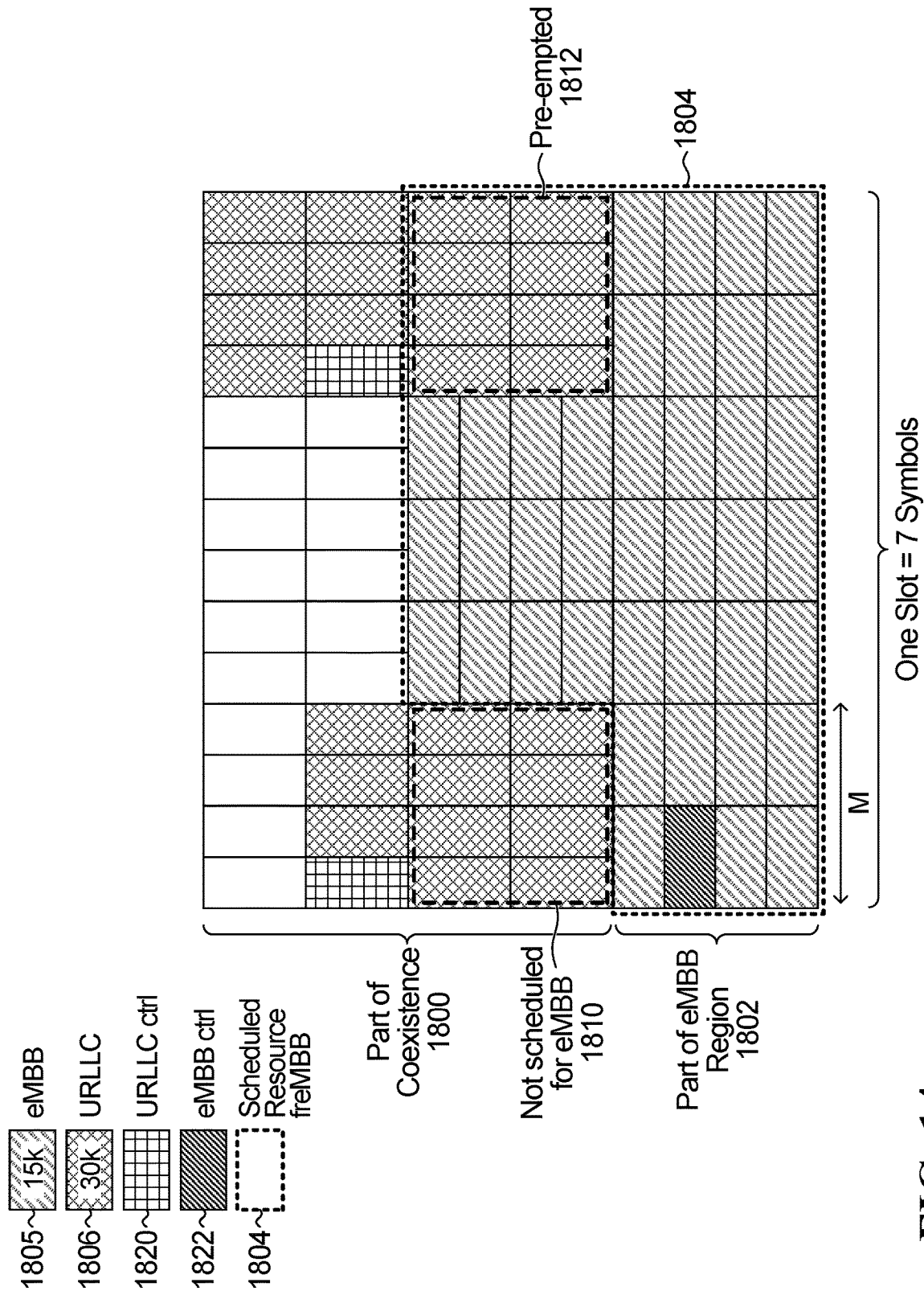
FIG. 14 depicts an example where resource allocation signalling includes two parts for allocating M symbols, and L-M symbols where there are L symbols in a slot.

In the example of FIG. 14 there are L=7 15 kHz symbols in a slot shown in the horizontal direction. The vertical direction is frequency, shown in units of resource block groups. Note that 30 kHz symbols for URLLC traffic have half the duration of 15 kHz symbols, but twice the bandwidth, i.e. an RBG with 30 KHz subcarrier spacing has an RBG bandwidth twice that of 15 KHz subcarrier spacing.

Resources scheduled for 15 kHz eMBB traffic are indicated at 1804. The scheduled resources 1804 span both regions 1800,1802. Any eMBB traffic sent within scheduled resources 1804 is transported using one numerology, 15 KHz in this example. Resources used to transmit URLLC traffic for 30 KHz traffic are indicated at 1806, and this includes a first region 1810 at the start of the slot, and a second region 1812 near the end of the slot.

The scheduler is aware of the first region 1810 at the start of the slot, and can perform eMBB resource allocation accordingly to avoid this region. However, at the start of the slot, the scheduler is not aware of the second region 1812, and as such resources 1804 scheduled for eMBB traffic overlap with this second region 1812. eMBB traffic is pre-empted by the URLLC traffic in the area of overlap with the result that the portion of scheduled resources 1804 that are actually used for eMBB traffic is that indicated at 1805.

A time-dependent scheduling composed of two bitmaps can be employed to inform the eMBB UE of its scheduled resources 1804. For this example, the first bitmap is valid for M=2 symbols and the second bitmap is valid for M=5 symbols.

URLLC control is indicated at 1820, and eMBB control is indicated at 1822. With the first bitmap that is valid for the M=2 symbols, 4 RBGs scheduled for eMBB. This avoids a conflict with resources scheduled for URLLC traffic during the first two symbols. For the remainder of the slot, the next five symbols, 8 RBGs scheduled. 15 KHz numerology is used for the eMBB traffic, even in portions that overlap with the coexistence region.

In the illustrated example, the part of the eMBB resources that are in the coexistence region are pre-empted during the $6^{th}$ and $7^{th}$ symbols to allow for a URLLC transmission. Thus, starting from a possible 7 symbol by 8 resource block resource space, part of the first two symbols are not allocated through scheduling, and part of the last two symbols are pre-empted. A pre-emption indication can be used to signal to the eMBB UE that part of its resources have been pre-empted.

As noted previously, the embodiments in which a single numerology is used for an eMBB TB are also applicable where there is no bandwidth dedicated to URLLC or eMBB. A more general embodiment is provided in which a granularity can be defined/chosen as a partition/offset in time. During this period, a first frequency allocation is indicated, and for the later period, another frequency allocation is indicated. In a specific example, the offset can be based on URLLC granularity in time or number of symbols in the control region of a slot or a common duration.

eMBB TB Composed of Multiple Numerologies

In another embodiment, bandwidth partitions for eMBB-only and URLLC are configured, for example semi-statically, and as before, eMBB TB can be scheduled spanning both eMBB-only and coexistence regions. For this embodiment, the URLCC traffic in the coexistence region uses a first numerology, and eMBB traffic in the coexistence region also uses the first numerology, while the eMBB traffic in the eMBB-only region uses a second numerology. Thus, the numerologies for the eMBB-only region and the coexistence region can be pre-configured.

As in the above example, an eMBB UE operating in the coexistence region is subject to pre-emption, and needs to monitor for corresponding signaling. Bandwidth partitions for each UE may also be configured semi-statically. Some eMBBs may be configured with bandwidth partitions that span the two regions in which case such UEs will monitor for a pre-emption signal, while other eMBB UEs may be configured with bandwidth partitions that are only within the eMBB-only region in which case such UEs will not need to monitor for pre-emption signalling.

Once again, time-dependent frequency resource allocation can be indicated, for example in eMBB DCI.

If part of an eMBB TB is scheduled in the coexistence region, that part is transmitted with the numerology of the coexistence region. The part of the TB scheduled in the eMBB-only region is transmitted with the numerology of that region.

More generally, multiple numerologies can be configured for a UE, for example up to M numerologies, these including a respective numerology for each of various parts of the UEs bandwidth partition. This can be done independently of the coexistence region, and can be applied even for the situation where there is no coexistence region, and/or there is only a coexistence region. This can be configured semi-statically for example using higher layer signaling, or dynamically.

In some embodiments, for eMBB allocation purposes, a RB grid (or an RBG grid) is defined that is based on a default numerology. For example, the frequency dimension of the grid may be based on the largest SCS supported. When a grid is employed, allocations conform to the grid spacing, and allocations smaller than the grid spacing are not performed.

Figure 15A:
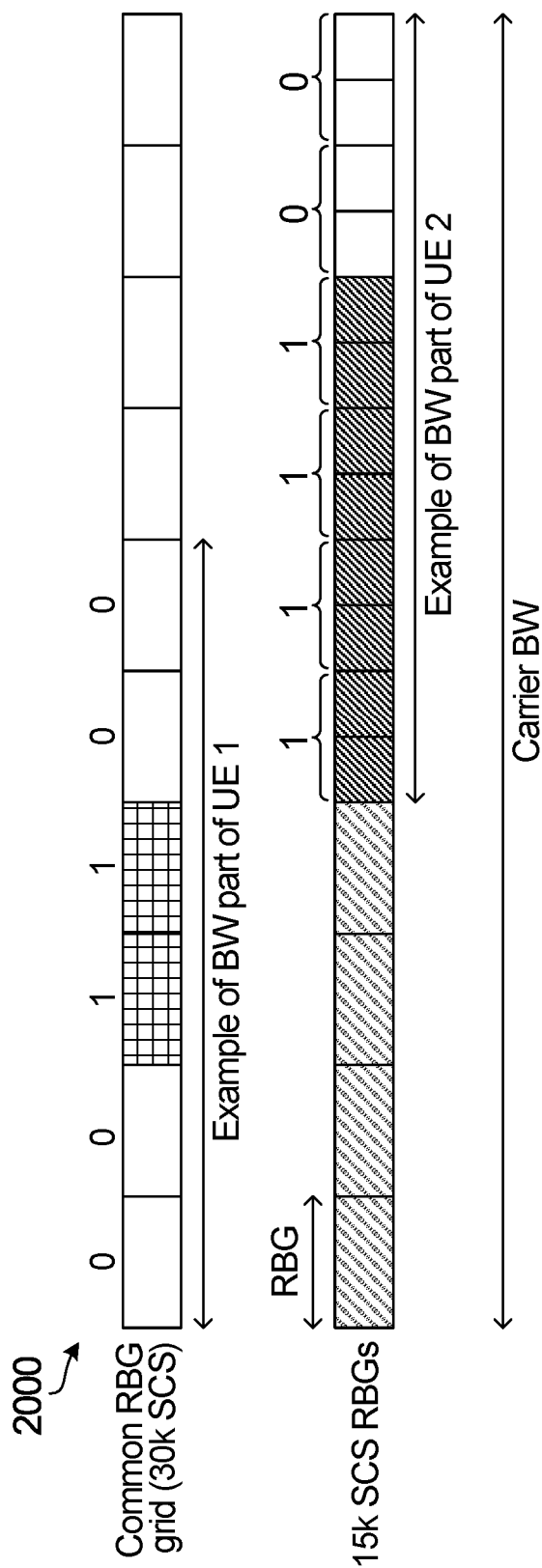
FIG. 15A depicts an example of scheduling that is based on a common PRB assignment granularity or grid.

In FIG. 15A, an example is shown where both 30 kHz and 15 kHz SCS can be used for traffic scheduling. Scheduling is performed based on a common PRB assignment granularity or grid. In one example, the grid can be based on PRB or group of PRBs of the largest SCS. The transmission of UE 1 uses 30 kHz and UE 2 uses 15 kHz. PRB bitmap granularity is same for both UEs. For example, '1' in the PRB bitmap indicates x RBGs for 30 KHz, whereas '1' means 2× RBGs for 15 Khz. In FIG. 15A, x=1 is assumed, but the same approach can be applied to other values of x. It is noted that this is a general embodiment that does not depend upon whether TB scheduling uses a single or multiple numerologies.

In some embodiments, the numerology used to transmit scheduling indications may be different than the numerology of the scheduled resource. For example, the indication may be transmitted in the eMBB-only region with a 15 KHz numerology, to schedule traffic in 30 KHz resources.

Figure 15B:
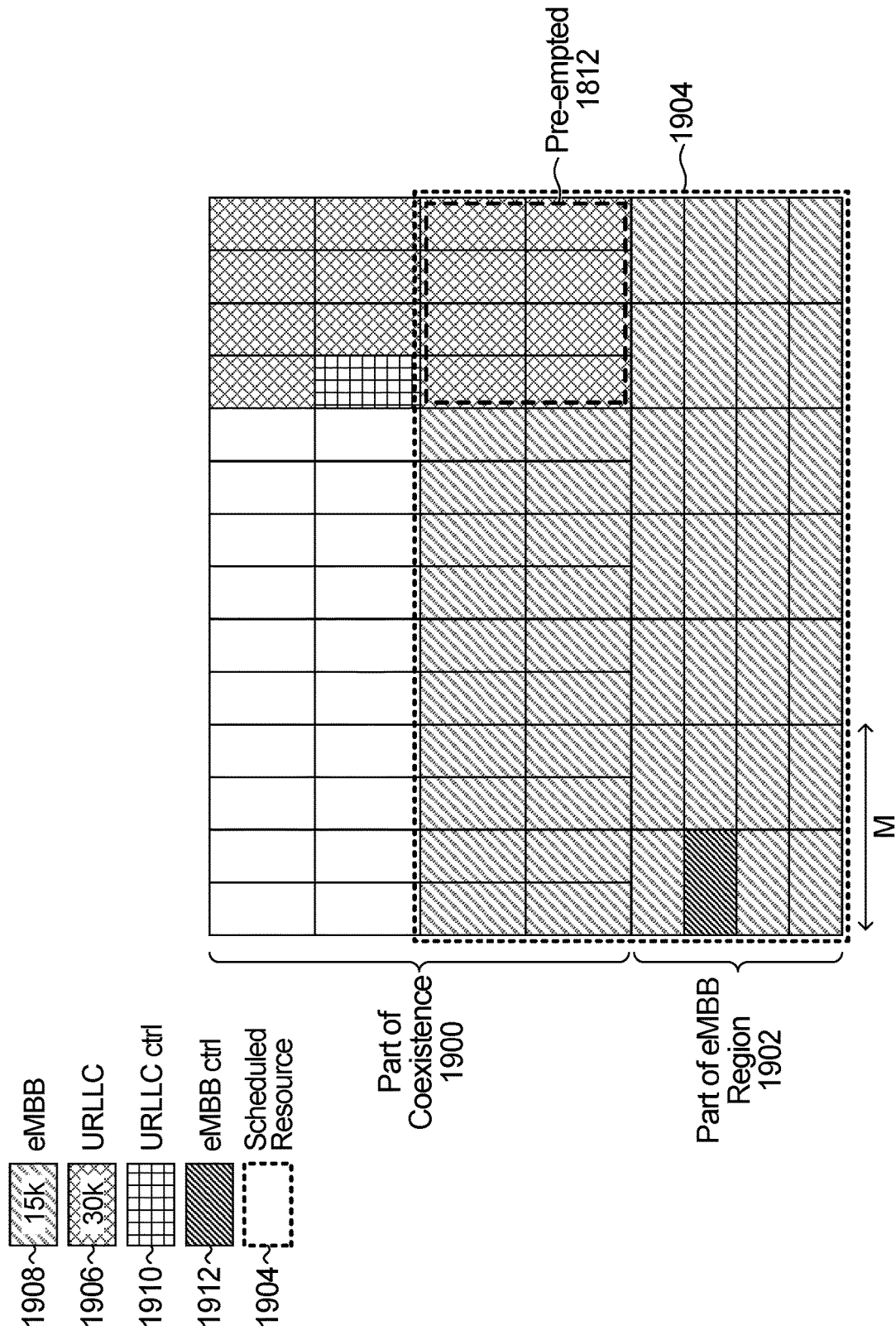
FIG. 15B depicts an example of scheduling eMBB traffic with multiple numerologies, with pre-emption.
Figure 15C:
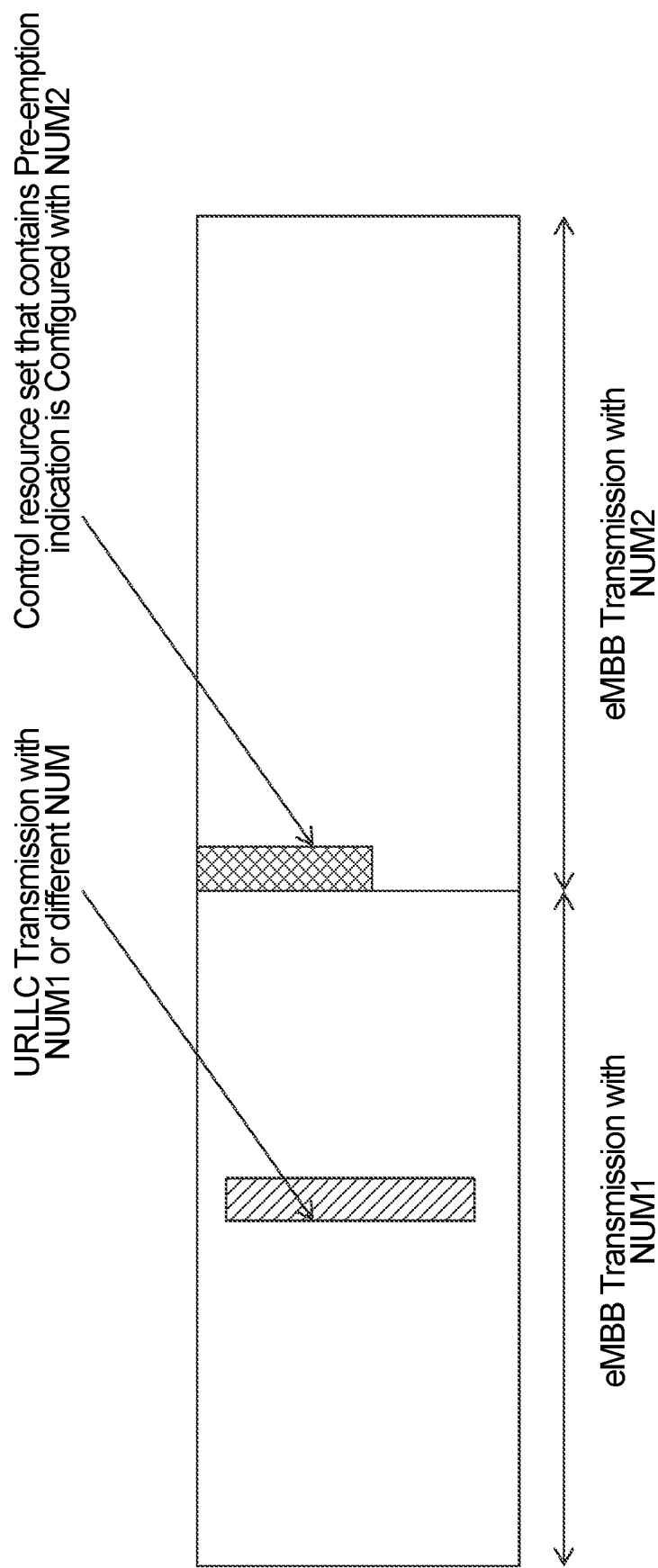
FIG. 15C depicts an example where a control resource set configured for sending a pre-emption indication may be of a different numerology than the one used for data transmission.

In some embodiments, a first sub-carrier spacing for the numerology of the coexistence region is a multiple P of a second sub-carrier spacing for the eMBB only region, and a grid is based on RB or RBG size for the larger sub-carrier spacing. In this case, the scheduling information comprises a bitmap that includes bits in respect of the coexistence region and bits in respect of the eMBB-only region. However, the bitmap need not have explicit sections or partitions, as the meaning of each bit in the bitmap will be known to the UE. Each bit in the section in respect of coexistence region is in respect of a single RB or RBG of the first numerology. Each bit in the section in respect of the eMBB-only region is in respect of a set of P RBs or RBGs of the second numerology. The same approach can be employed for a case where a second sub-carrier spacing for the numerology of the coexistence region is a multiple P of a first sub-carrier spacing for the eMBB only region, and a grid is based on RB or RBG size for the larger sub-carrier spacing. FIG. 15C shows another example where control resource set configured for sending a pre-emption indication may be of a different numerology than the one used for data transmission. This approach may be particularly suitable where a TDM of numerologies is employed.

In some embodiments, a DCI used to schedule eMBB traffic will indicate numerology specific resource allocation explicitly or implicitly. For example, the above-described two-part resource allocation field may be employed. A first part is a K1-bit bitmap for K1 RBs or RBGs that is valid for M 30 KHz symbols, and a second part is a K2-bit bitmap for K2 RBs or RBGs valid for L-M 30 KHz symbols, where L is the number of symbols in a slot. Allocations in respect of RBGs in the coexistence region will be for 30 KHz RBGs and allocations in respect of RBGs in the eMBB-only region will be for 15 KHz RBGs. In one example, K1 and K2 can be same or different.

As before, the value of M may be configurable. For example, this can be transmitted as part of a layer 1 broadcast or can be sent to eMBB UE with RRC signalling.

A specific example will be described with reference to FIG. 15B. Part of the coexistence region is indicated at 1900 and this is used for 30 KHz traffic only, and part of the eMBB-only region is indicated at 1902 and this is used for 15 KHz traffic only. Scheduled resources for eMBB are indicated at 1904. URLLC traffic is indicated at 1906, and this pre-empts part of the eMBB traffic, such that actually transmitted eMBB traffic occupies resources 1908.

URLLC control is indicated at 1910, and eMBB control is indicated at 1912. As in the previous example, a two part bitmap is employed. This includes a first bitmap that is valid for the M=2 symbols. In FIG. 15B this schedules 6 RBGs for eMBB, including 4 in eMBB-only region 1902 and 2 RBGs in coexistence region 1900. For the remainder of the slot, the next five symbols, 6 RBGs are also scheduled. 15 KHz numerology is used for the eMBB traffic in the eMBB-only region 1902 and 30 KHz numerology is used in the coexistence region 1900. While in this example, the scheduled resources are the same throughout the slot, the bitmaps can be used to indicate time dependent allocations, as per the example of FIG. 14.

In the illustrated example, the part of the scheduled eMBB resources 1904 that are in the coexistence region 1900 are again pre-empted during the $6^{th}$ and $7^{th}$ symbols to allow for a URLLC transmission.

In some embodiments, a DCI format is employed that has numerology specific fields for the allocation of RBs. For example, where $N_{num}$ numerologies are supported by a UE, the resource allocation will divide RB allocation into $N_{num}$ fields for full dynamic allocation. The number $N_{num}$ of numerologies the UE supports may be configurable.

For each numerology, a bitmap indicates a respective RB allocation. In some embodiments, RB allocation is based on a default numerology, e.g., the numerology with the largest sub-carrier spacing. However, in some embodiments, numerology specific fields are not necessary, but rather RB allocation is based on a semi-static bandwidth partitioning for the numerologies. In this case, an explicit indication of numerology specific resource block allocation is not needed.

For example, where there is a semi-static partitioning of the coexistence region and eMBB-only region, each with a respective numerology, a UE with knowledge of the partitioning knows where is the divide between the two numerologies and which bandwidth partition is associated with which numerology.

As in the above example, RB allocation may be performed based on a default PRB grid, for example one based on a RBs size for a 30 kHz sub-carrier spacing. Then with reference to the 1's in the bitmap together with the information of the bandwidth partition, a UE knows which 1's are associated with which numerology. Here, a UE will receive a bitmap based on 30 kHz. For the part of the bitmap corresponding to the eMBB-region, each 1 in bitmap will refer to 2 consecutive 15 kHz RBs nested within a 30 kHz RB spacing, in accordance with the PRB grid.

Figure 16:
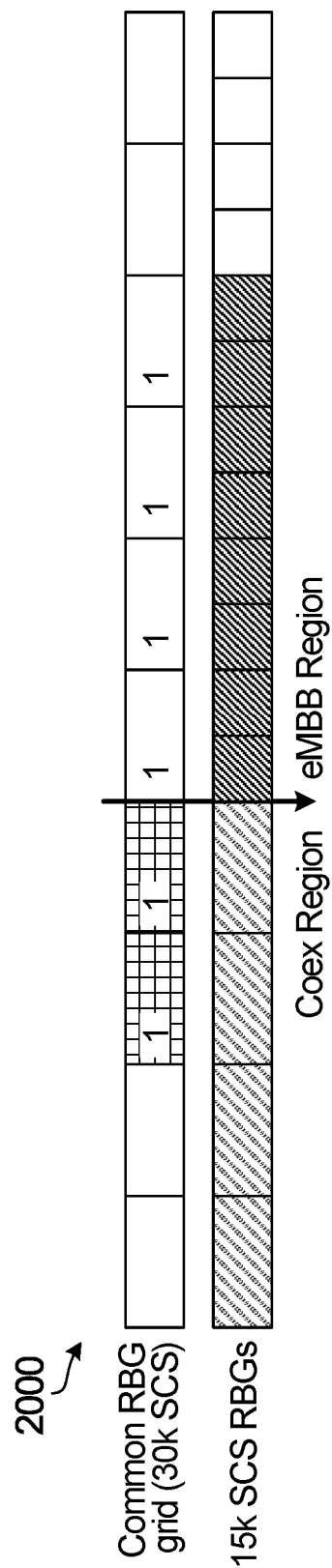
FIG. 16 depicts an example of RB scheduling based on a default PRB grid.

This will be explained further with reference to FIG. 16. In FIG. 16, frequency is in the horizontal direction. A 30 KHz RBG grid is shown at 2000. Also shown are 15 KHz RBGs in the eMBB region. A bitmap is used that aligns with the 30 KHz grid. In the illustrated example, there are 10 positions on the grid, so a 10 bit bitmap will suffice. The first 4 bits are in respect of 4 30 KHz RBs in the coexistence region, and the next 6 bits are in respect of 6 pairs of 30 KHz RBGs.

Code Block Group Based Scheduling

In some embodiments, for any of the previously described embodiments, mixed numerology scheduling is performed in a manner that a single code block group (CBG) does not span multiple numerologies. As described previously, one TB can be scheduled spanning multiple numerologies. If one TB is composed of N CBGs, then M (<N) CBGs are mapped to resources of a first numerology and the remaining N-M CBGs are mapped to resources of a second numerology.

In LTE/NR, a TB is divided into smaller size code blocks (CB)s, a process which is referred as code block segmentation, before being applied to the channel coding/Rate matching modules in the physical layer. This is usually done in order to match sizes supported by the FEC. For example, segmentation happens if the TB size is above a certain threshold. Each CB is appended its own CRC in addition to the CRC appended to the whole TB.

A CBG refers to a group of code blocks (CB)s. A code block is a sequence of information bits which is input to the FEC encoder after CRC appending. CBG and RBG are different things. RBG is a unit of resource allocation whereas CBG is a unit of HARQ feedback. CBG is introduced in NR in order to have the possibility to retransmit a portion of a TB while at the same time reducing the Ack/Nack HARQ feedback overhead compared to CB-based Ack/Nack HARQ feedback.

After CRC appending to CBs and TBs, FEC encoding, interleaving, rate matching, QAM/layer mapping, precoding etc, the resulting information symbols are mapped to resource elements (RE)s (a RE is a subcarriers over one OFDM symbol in OFDM terminology). Each physical channel corresponds to a set of resource elements in the time-frequency grid that carry information bits. A physical channel is mapped to REs, PRBs and RBGs.

Depending on the resource allocation type (e.g. type 0, 1, 2 in LTE), RBG can be the unit of resource allocation in the frequency domain. An RBG consists of a group of PRBs, in a specific example each PRB corresponding to 12 subcarriers in the frequency domain which in turn corresponds to 12 resource elements in terms of frequency domain resources. Note that the frequency span of a PRB depends on the numerology, i.e. the numerology specific subcarrier spacing.

A DCI can be transmitted using the first or the second numerology to indicate the resources assigned.

The number of CBGs may depend on the size of the TB. In some embodiments, the number of code blocks in a CBG may be configurable. In some embodiments, a time-first mapping of CBGs to resources is employed subject to the constraint that a CBG can be in only one numerology.

Figure 17:
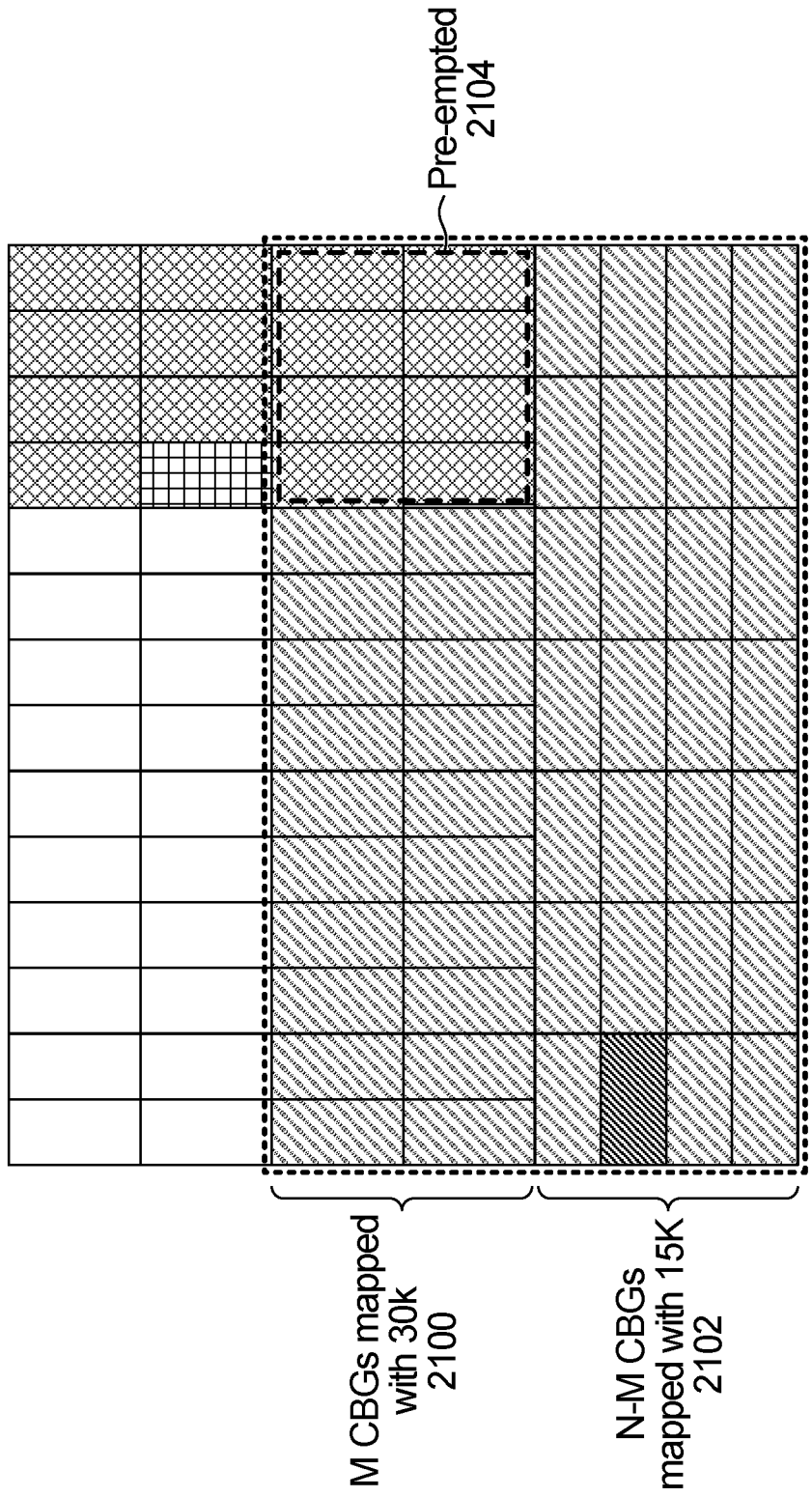
FIG. 17 depicts an example where M CBGs are mapped to a first numerology and N-M CBGs are mapped to a second numerology.

A CBG mapping rule known to both the UE and the network is used, and as noted above, one CBG may not be mapped across multiple numerologies. An example is shown in FIG. 17 where M CBGs are shown mapped to resources 2100 with a 30 KHz numerology, and N-M CBGs are shown mapped to resources 2102 with a 15 KHz numerology. As in other embodiments, pre-emption can take place, as indicated at 2104.

Slot Aggregation in Coexistence Region

Slot aggregation may be employed for eMBB traffic in the coexistence region. In other words, while a shorter slot definition may be used for URLLC traffic, for eMBB traffic, allocation can be performed based on an aggregation of URLLC slots. This can have an effect on the transmission of demodulation reference symbols (DMRS). In a slot, the location of front-loaded DMRS can be pre-configured. DMRS symbols are uplink symbols transmitted by URLLC and eMBB UEs to assist in channel estimation on the uplink so that data can be demodulated and decoded. In accordance with an embodiment of the invention, DCI or higher layer signalling is employed to indicate one of several possible DMRS configurations and/or antenna ports to use.

In some embodiments, first and second configurations are provided. In the first configuration, when URLLC traffic is scheduled in the coexistence region, no resource is reserved for eMBB DMRS transmission in some areas, for example a subsequent slot of an aggregation. In some embodiments, a frontloaded DMRS or a DMRS of a first slot of the aggregation is still protected in such a situation. In a second configuration, when URLLC traffic is scheduled in the coexistence region, this does not include resources reserved for eMBB DMRS transmission. In another example, UEs are notified explicitly or implicitly if subsequent aggregated slot or mini-slot has a DMRS configured in it or not. The notification can be via RRC signaling or dynamic in the DCI.

Figure 18:
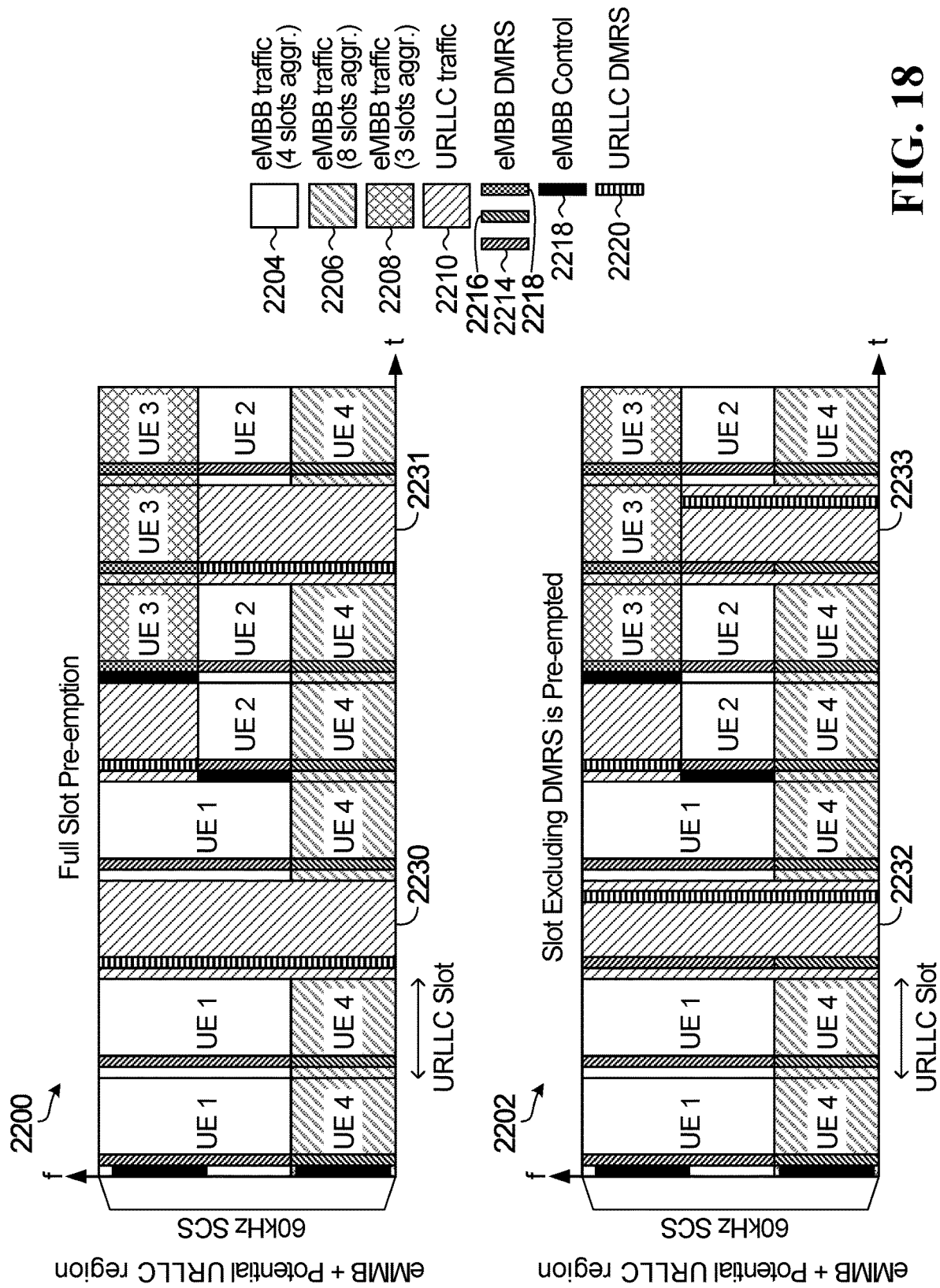
FIG. 18 depicts an example of full slot pre-emption and an example where a slot excluding DMRS is pre-empted.

These two configurations will be further described by way of example with reference to FIG. 18 which shows examples of the first and second configurations generally indicated at 2200 and 2202 respectively. In each example, resource allocation within a 60 KHz numerology coexistence region is being considered. A scheduling period is shown with 8 URLLC slots in the time dimension.

Both examples depict URLLC traffic at 2210 with a corresponding URLLC DMRS 2220. Also shown is eMBB traffic with 4 slot aggregation 2204, eMBB traffic with 8 slot aggregation 2206 and eMBB traffic with 3 slot aggregation 2208. Corresponding eMBB DMRS are indicated at 2214, 2216 and 2218.

With the first example 2200, full slot pre-emption is taking place, meaning that for the full time dimension of a slot, URLLC traffic 2204 and URLLC DMRS 2220 occupy a full slot, with no space being left for eMBB DMRS transmission. In the frequency dimension, pre-emption can still occur for less than the full bandwidth of the co-existence region. It can be seen in the third slot 2230, this only contains URLLC Traffic and URLLC DMRS, and does not contain eMBB DMRS. In the seventh slot 231, in the frequency dimension part of a 4 slot aggregation for UE2 is pre-empted (with no space for DMRS for eMBB for UE2) and part of an 8 slot aggregation for UE 4 is pre-empted (with no space for DMRS for UE4), but part of slot 231 used for the 3 slot aggregation for UE3 is not pre-empted, and this still contains DMRS for eMBB for UE3.

For the third slot 2230, the URLLC traffic is in a subsequent slot of a 4 slot aggregation for eMBB for UE1, and also in a subsequent slot of an 8 slot aggregation for eMBB for UE4. However, for this situation, if part of a first slot of an aggregation was pre-empted, space would be maintained for the eMBB DMRS. For example, if the first slot of the 3 slot aggregation 2208 were pre-empted, eMBB DMRS would still be transmitted in the first slot.

With the second example 2202, partial slot utilization is taking place, meaning that URLLC traffic 2204 and URLLC DMRS 2220 occupy a portion of a slot, with space being left for eMBB DMRS transmission. It can be seen in the third slot 2232, this contains URLLC Traffic and URLLC DMRS, and also contains eMBB DMRS. This is also the case for the seventh slot 2233.

In some embodiments, both eMBB and URLLC UE's DCI may indicate which DMRS configuration or antenna port or pattern is used. One option is to indicate this from a set of possible configurations, the set having previously been set via higher layer signalling. Alternatively, DMRS configuration may always be indicated via higher layer signalling.

With some configurations, even though a slot is preempted, its DMRS is protected, for example, to enable reliable time domain interpolation for channel estimation at high speed. If a configured location of DMRS of URLLC is the same symbol where eMBB DMRS is, the DCI of URLLC can indicate a different configuration so that an overlap is avoided.

An example of signalling for this embodiment is a 2 bit field in a DCI that indicates which of several DMRS possibilities are used. In a specific example, the following signalling is used:

01 to indicate that the first of two DMRS possibilities is used for DMRS 10 to indicate that the second of two DMRS possibilities is used 11 to indicate both DMRS possibilities are used for DMRS In another embodiment, the location of the DMRS within a slot for both traffic types is fixed, in one of the earlier symbols of the slot, for example the second symbol. With this embodiment, orthogonal DMRS signalling in the same symbol period can be used.

Configuration of Control and Data Bandwidth Parts

In one embodiment, control resource sets (CORESETs) of different UEs can be configured within a pre-defined bandwidth part. CORESETs of different UEs can be of different numerologies. If a UE supports multiple numerologies, it may observe CORESETs of multiple configured numerologies. A separate bandwidth part can be configured for data transmission. A control resource set is a set of resources, including but not limited to time-frequency resources, which are associated with the common and UE-specific search spaces for blind decoding of NR-PDCCH. A UE can be configured with multiple CORESETS with high-layer signaling.

In one example, bandwidth part that contains control resources may or may not be used for data transmission. A UE can be configured with one or more bandwidth parts, and at least one of the bandwidth parts configured for a UE contains the configured CORESET(s) of the UE.

In one example, control and data bandwidth parts can be of same or different numerologies.

Figure 19:
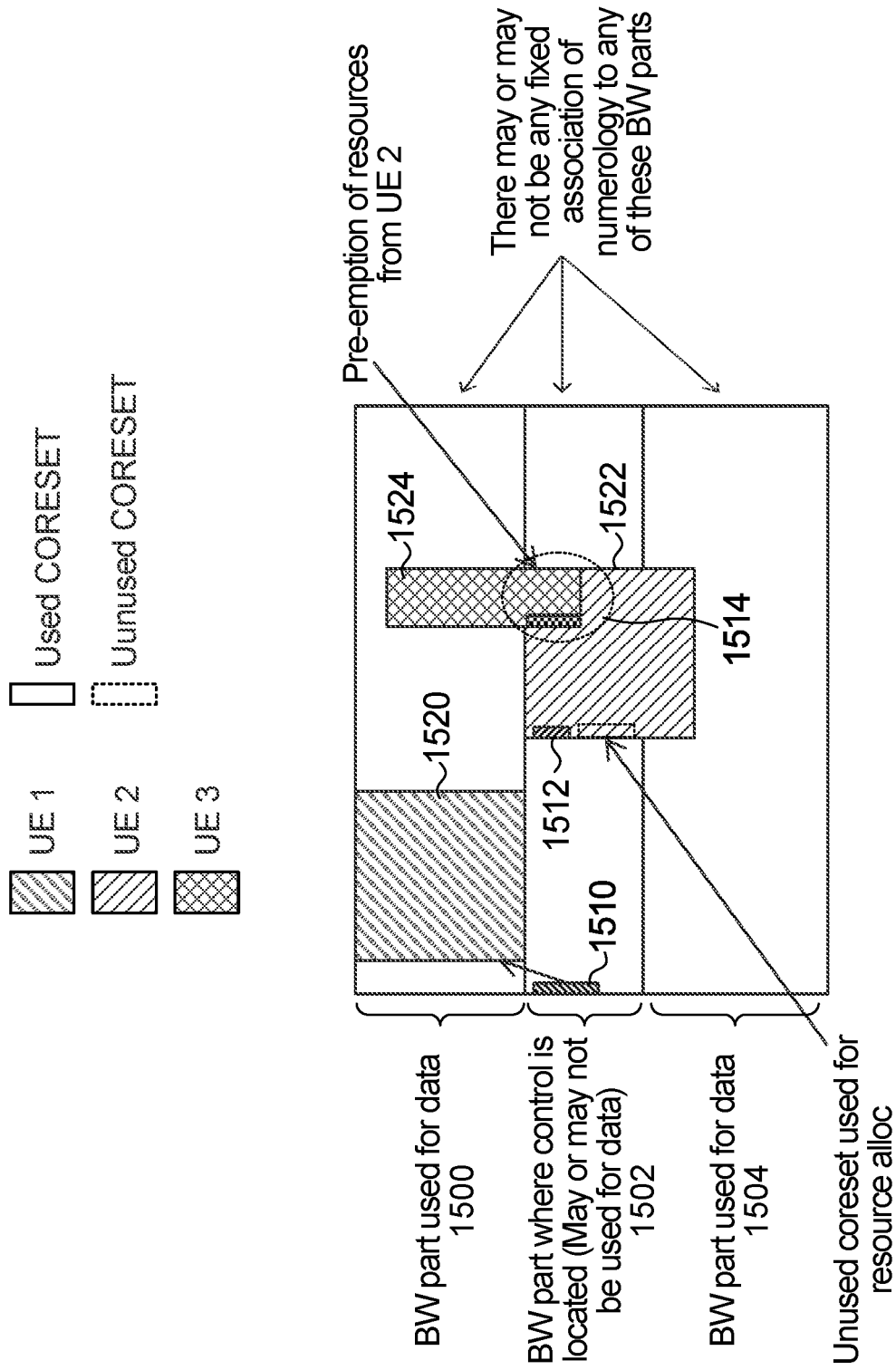
FIG. 19 is an example where control and data bandwidth parts can be of the same or different numerologies.

An example is shown in FIG. 19. Shown is a bandwidth part 1500 used for data, a bandwidth part 1502 where control is located, which may or may not be used for data, and another bandwidth 1504 part used for data. Also shown are control transmissions 1510,1512,1514 in respect of resource allocations 1520,1522,1524 for three UEs. There may or may not be any fixed association of numerology to the bandwidth parts.

In a first example, UE 1 receives control which indicates resource allocation within the data bandwidth part. Here, control is contained in a first bandwidth part and data allocation occurs within a second bandwidth part configured for the UE 1. Data resource allocation may start at the same time when control is received or at a later time. For UE 1, control and data are shown to be located in different BW parts. In another example, control and data could be located within same BW part but may be disjoint in frequency. Also, there can be reserved areas within a BW part which are not used for data transmission. UEs may be notified if there is any reserved areas, either semi-statically or dynamically.

In another example, UE 2 is configured with a bandwidth part that overlaps both control bandwidth part and data bandwidth part. In other words, for UE 2, data allocation may span both control and data bandwidth parts. As data allocation includes some part of the control region/bandwidth part, there is a chance that resource assigned for data transmission for UE2 includes CORESETs of other UEs. UE 3 receives control over its CORESET which is within the resources assigned for UE 2. In that case, data/control transmission of UE 3 pre-empts some part of UE2 data.

In one example, control and data can be assigned with same numerology, however for robustness, control can be sent with ECP.

In one example, unused CORESETs can be used for data resources at the time of scheduling. In one example, only subsequent group common CORESET are included in data resource allocation. During reception of data, UEs may monitor for potential group common control sent over those CORESETs. If control is received, then those areas are not used for data.

Although this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The invention claimed is:

1. A method in a user equipment, the method comprising:
receiving scheduling information to schedule a transmission of a transport block, the scheduling information comprising a first field indicating a first resource allocated for a first part of the transport block and a second field indicating a second resource allocated for a second part of the transport block, the first resource and the second resource associated with different numerologies.

2. A method in a user equipment, the method comprising:
receiving a configuration of a first numerology for a first bandwidth partition and a second numerology for a second bandwidth partition;
receiving scheduling information to schedule a downlink transmission resource, the scheduling information comprising a first field that schedules resources for a first resource allocation and a second field that schedules resources for a second resource allocation, wherein receiving the scheduling information is in respect of resource allocations for a transport block that includes a part in the first bandwidth partition and a part in the second bandwidth partition; and
receiving a transmission containing the transport block, a portion of the transmission that is in the first bandwidth partition being received with the first numerology, and a portion of the transmission that is in the second bandwidth partition being received with the second numerology.

3. The method of claim 1, further comprising:
receiving a configuration of a first numerology for a first bandwidth partition and a second numerology for a second bandwidth partition; and
receiving the transport block over the first resource located within the first bandwidth partition and the second resource located within the second bandwidth partition, wherein the scheduling information is based on a resource block (RB) or resource block group (RBG) grid based on a default numerology.

4. The method of claim 3, wherein the default numerology is one of the first numerology and the second numerology with a larger sub-carrier spacing.

5. The method of claim 4, wherein:
the first numerology has a first sub-carrier spacing that is a multiple P of a second sub-carrier spacing of the second numerology;
the scheduling information comprises a bitmap containing bits indicating a location of the first resource in the first bandwidth partition for the first numerology and bits indicating a location of the second resource in the second bandwidth partition for the second numerology;
each bit indicating the location of the first resource in the first bandwidth partition for the first numerology is in respect of a single RB or RBG of the first numerology; and
each bit indicating the location of the second resource in the second bandwidth partition for the second numerology is in respect of a set of P RBs or RBGs of the second numerology.

6. The method of claim 3, wherein:
receiving the configuration comprises receiving a configuration of M numerologies, where M>=2, and the M numerologies comprise the first numerology and the second numerology;
the transport block includes respective parts in each of the M numerologies, and the scheduling information indicates resource allocations for each of the M numerologies; and
receiving the transport block comprises receiving the transport block using each of the M numerologies in accordance with the received scheduling information.

7. The method of claim 6, wherein:
receiving the transport block comprises receiving code block groups, wherein each code block group is mapped to a single numerology of the M numerologies.

8. The method of claim 1, wherein the first field schedules resources for a first set of M symbols, the second field schedules resources for a second set of L-M symbols, and there are L symbols in a scheduling period.

9. The method of claim 1, wherein the scheduling information is in respect of a resource allocation for resources that include a part subject to pre-emption by latency sensitive traffic and a part that is not subject to pre-emption.

10. A user equipment (UE) comprising:
a transmitter, a receiver, at least one antenna, a non-transitory memory storage comprising instructions, and a processor in communication with the non-transitory memory storage, wherein the processor executes the instructions to:
receive scheduling information to schedule a transmission of a transport block, the scheduling information comprising a first field indicating a first resource allocated for a first part of the transport block and a second field indicating a second resource allocated for a second part of the transport block, the first resource and the second resource associated with different numerologies.

11. A user equipment (UE) comprising a transmitter, a receiver, a processor, and at least one antenna, the UE configured to:
receive scheduling information to schedule a downlink transmission resource, the scheduling information comprising a first field that schedules resources for a first resource allocation and a second field that schedules resources for a second resource allocation;
receive a configuration of a first numerology for a first bandwidth partition and a second numerology for a second bandwidth partition, wherein receiving the scheduling information is in respect of resource allocations for a transport block that includes a part in the first bandwidth partition and a part in the second bandwidth partition; and receive a transmission containing the transport block, a portion of the transmission that is in the first bandwidth partition being received with the first numerology, and a portion of the transmission that is in the second bandwidth partition being received with the second numerology.

12. The UE of claim 10, wherein the processor further executes the instructions to:
receiving a configuration of a first numerology for a first bandwidth partition and a second numerology for a second bandwidth partition; and
receiving the transport block over the first resource located within the first bandwidth partition and the second resource located within the second bandwidth partition, wherein the scheduling information is based on a resource block (RB) or resource block group (RBG) grid based on a default numerology.

13. The UE of claim 12, wherein the default numerology is one of the first numerology and the second numerology with a larger sub-carrier spacing.

14. The UE of claim 13, wherein:
the first numerology has a first sub-carrier spacing that is a multiple P of a second sub-carrier spacing of the second numerology;
the scheduling information comprises a bitmap containing bits indicating a location of the first resource in the first bandwidth partition for the first numerology and bits indicating a location of the second resource in the second bandwidth partition for the second numerology;
each bit indicating the location of the first resource in the first bandwidth partition for the first numerology is in respect of a single RB or RBG of the first numerology; and
each bit indicating the location of the second resource in the second bandwidth partition for the second numerology is in respect of a set of P RBs or RBGs of the second numerology.

15. The UE of claim 12, wherein:
receiving the configuration comprises receiving a configuration of M numerologies, where M>=2, and the M numerologies comprise the first numerology and the second numerology;
the transport block includes respective parts in each of the M numerologies, and the scheduling information indicates resource allocations for each of the M numerologies; and
receiving the transport block comprises receiving the transport block using each of the M numerologies in accordance with the received scheduling information.

16. The UE of claim 15, wherein:
receiving the transport block comprises receiving code block groups, wherein each code block group is mapped to a single numerology of the M numerologies.

17. The UE of claim 10, wherein the first field schedules resources for a first set of M symbols, the second field schedules resources for a second set of L-M symbols, and there are L symbols in a scheduling period.

18. The UE of claim 10, wherein the scheduling information is in respect of a resource allocation for resources that include a part subject to pre-emption by latency sensitive traffic and a part that is not subject to pre-emption.

19. A method in a base station, the method comprising:
transmitting scheduling information to schedule a transmission of a transport block, the scheduling information comprising a first field indicating a first resource allocated for a first part of the transport block and a second field indicating a second resource allocated for a second part of the transport block, the first resource and the second resource associated with different numerologies.

20. A method in a base station, the method comprising:
transmitting a configuration of a first numerology for a first bandwidth partition and a second numerology for a second bandwidth partition;
transmitting scheduling information to schedule a downlink transmission resource, the scheduling information comprising a first field that schedules resources for a first resource allocation and a second field that schedules resources for a second resource allocation, wherein transmitting the scheduling information is in respect of resource allocations for a transport block that includes a part in the first bandwidth partition and a part in the second bandwidth partition; and
transmitting a transmission containing the transport block, a portion of the transmission that is in the first bandwidth partition being transmitted with the first numerology, and a portion of the transmission that is in the second bandwidth partition being transmitted with the second numerology.

21. The method of claim 19, wherein the first field schedules resources for a first set of M symbols, the second field schedules resources for a second set of L-M symbols, and there are L symbols in a scheduling period.

22. The method of claim 19, wherein the scheduling information is in respect of a resource allocation for resources that include a part subject to pre-emption by latency sensitive traffic and a part that is not subject to pre-emption.

23. A base station comprising:
a transmitter, a receiver, a non-transitory memory storage comprising instructions, and a processor in communication with the non-transitory memory storage, wherein the processor executes the instructions to:
transmit scheduling information to schedule a transmission of a transport block, the scheduling information comprising a first field indicating a first resource allocated for a first part of the transport block and a second field indicating a second resource allocated for a second part of the transport block, the first resource and the second resource associated with different numerologies.

24. A base station comprising a transmitter, a receiver, a processor, and a scheduler configured to:
generate scheduling information for transmission by the transmitter to schedule a downlink transmission resource, the scheduling information comprising a first field that schedules resources for a first resource allocation and a second field that schedules resources for a second resource allocation;
transmit a configuration of a first numerology for a first bandwidth partition and a second numerology for a second bandwidth partition, wherein transmitting the scheduling information is in respect of resource allocations for a transport block that includes a part in the first bandwidth partition and a part in the second bandwidth partition; and
transmit a transmission containing the transport block, a portion of the transmission that is in the first bandwidth partition being transmitted with the first numerology, and a portion of the transmission that is in the second bandwidth partition being transmitted with the second numerology.

25. The base station of claim 23, wherein the first field schedules resources for a first set of M symbols, the second field schedules resources for a second set of L-M symbols, and there are L symbols in a scheduling period.

26. The base station of claim 23, wherein the scheduling information is in respect of a resource allocation for resources that include a part subject to pre-emption by latency sensitive traffic and a part that is not subject to pre-emption.

27. The method of claim 1, wherein the transport block corresponds to a downlink transmission.

28. The method of claim 1, wherein the transport block corresponds to an uplink transmission.

29. The method of claim 1, wherein the transport block corresponds to a sidelink transmission.

* * * * *